US005467524A

United States Patent [19]

Diemer

[11] Patent Number: 5,467,524

[45] Date of Patent: Nov. 21, 1995

[54] APPARATUS FOR TAGGING PLANTS

[75] Inventor: Gordon J. Diemer, Grand Ledge, Mich.

[73] Assignee: The John Henry Company, Lansing, Mich.

[21] Appl. No.: 232,768

[22] Filed: Apr. 25, 1994

Related U.S. Application Data

[63] Continuation-in-part of Ser. No. 46,031, Apr. 12, 1993, Pat. No. 5,339,517.

[51] Int. Cl.[6] ................................ B23P 21/00; B27F 7/17

[52] U.S. Cl. ................................ 29/701; 29/771; 29/809; 227/45; 227/65; 227/106

[58] Field of Search ................................ 29/701, 809, 820, 29/822, 235, 432.2, 703, 765, 771, 787, DIG. 37; 227/25, 45, 65, 73, 106; 156/DIG. 23; 264/293

[56] References Cited

U.S. PATENT DOCUMENTS

| | | | |
|---|---|---|---|
| 1,256,553 | 2/1918 | Grings | 227/20 |
| 1,628,848 | 5/1927 | Kingman | 227/83 |
| 2,536,573 | 1/1951 | Schafroth | 227/25 |
| 2,582,731 | 1/1952 | Young | 227/25 |
| 2,813,021 | 11/1957 | Sloan | 227/65 |
| 2,996,720 | 8/1961 | Mackechine | 227/76 |
| 3,412,895 | 11/1968 | Hilton | 29/809 X |
| 3,480,193 | 11/1969 | Ralston | 227/130 |
| 3,666,157 | 5/1972 | Kawai et al. | 227/131 |
| 3,762,621 | 10/1973 | Nishikawa | 227/76 X |
| 3,802,511 | 4/1974 | Good, Jr. | 239/270 |
| 4,211,352 | 7/1980 | Zilka | 227/130 |
| 4,215,808 | 8/1980 | Sollberger et al. | 227/146 |
| 4,572,419 | 2/1986 | Klaus et al. | 227/120 |
| 4,578,139 | 3/1986 | Stehouwer | 156/DIG. 23 |
| 4,662,551 | 5/1987 | Dudley et al. | 229/221 |
| 4,689,100 | 8/1987 | Coleman | 156/73.1 |
| 4,943,294 | 7/1990 | Knapp | 227/67 |

*Primary Examiner*—Timothy V. Eley
*Assistant Examiner*—Khan V. Nguyen
*Attorney, Agent, or Firm*—Price, Heneveld, Cooper, De Witt & Litton

[57] ABSTRACT

An apparatus for tagging plants includes a frame attached to a stand, and jaws operably mounted on the frame for receiving a plant branch. The apparatus includes a strip advancing mechanism, a tag advancing mechanism, a fastening mechanism, and a programmable controller for controlling the actuation of each of these mechanisms. The strip advancing mechanism is configured to advance a section of flexible strip onto the jaws in a loop around the plant branch from a continuous supply of strip material, and includes a cutter for cutting the section from the continuous supply of strip material once it is advanced. The tag advancing mechanism is configured to advance a tag to a position proximate the jaws from a continuous supply of interconnected tags, and includes a cutter for cutting the tag from the supply of tags. The fastening mechanism includes a stapler for stapling a staple to the tag to hold the tag to the section of strip and to hold the ends of the section together in the loop around the plant branch. An embossing die is located adjacent the jaws for embossing the tags with indicia immediately prior to stapling.

13 Claims, 18 Drawing Sheets

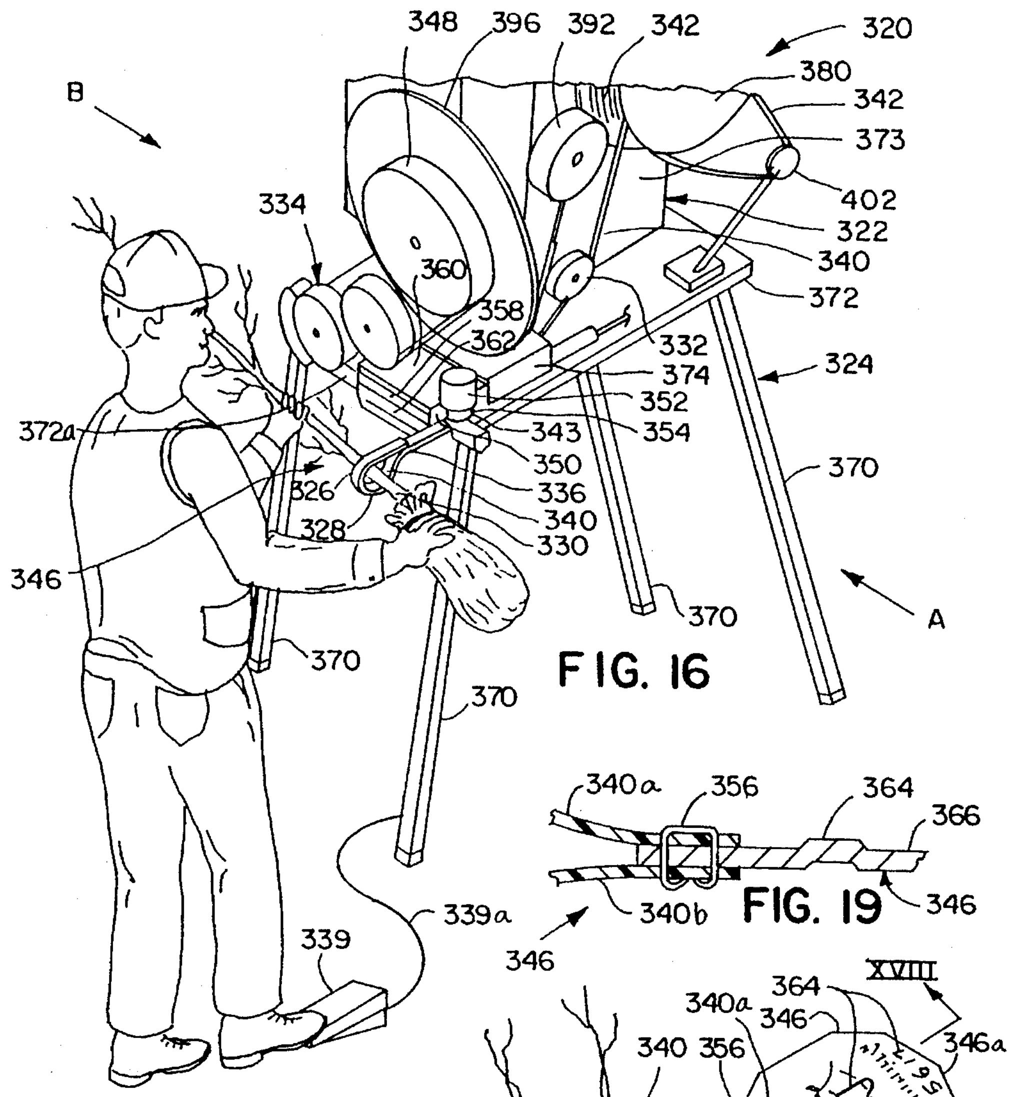
FIG. 16
FIG. 19
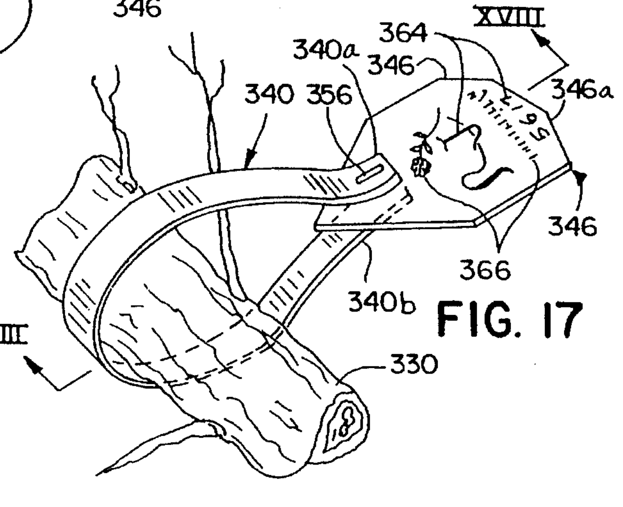
FIG. 17
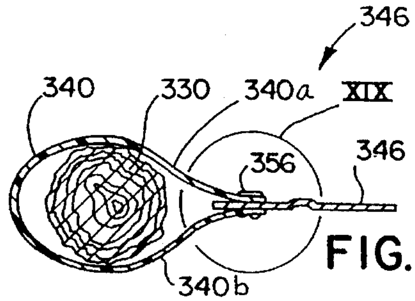
FIG. 18

APPARATUS FOR TAGGING PLANTS

CROSS REFERENCE TO RELATED APPLICATION

The present application is a continuation-in-part of application Ser. No. 8/046,031, filed Apr. 12, 1993, to inventor Gordon J. Dieruer, entitled "PLANT TAGGING APPARATUS" U.S. Pat. No. 5,339,517.

BACKGROUND OF THE INVENTION

The present invention relates generally to an apparatus for tagging plants and the like, and in particular relates to an apparatus adapted to loop a strip around a plant branch and to secure a tag to the plant branch by use of the strip.

A variety of tags have been designed to facilitate attaching identification tags and the like to plants without damaging the plants. Many of these tags have slits cut therein, the tags being made of a resilient material so that a plant branch can be forced into the slit to retain the tag to the branch. However, if the tag is too stiff or sharp, the bark of the plant branch can be damaged during or after attaching the tag. Alternatively, if the tag is not stiff enough or is creased during installation, these slit tags will not be as securely retained on the branch as is desired. Further, the method of attaching the tag to the branch by forcing the branch into the slit can be somewhat cumbersome and not as efficient as desired. For example, the installer must reach fully into the main part of the plant to reach a branch large enough to be used, which often requires extra effort and bending by the operator.

U.S. Pat. 2,582,731 to Young discloses a machine in which a plant stem is placed on a tag strip and the strip is then bent around the plant stem by a mechanical finger and stapled. However, the mechanical finger is potentially subject to maintenance problems and further is necessarily exposed such that it can be a safety hazard to an operator of the machine. Further, the tag is doubled-back on itself and stapled during the machine operation, which is expensive since the doubling-back wastes tag material. The machine is also limited as to the shape and size of the tag that can be used.

Aside from the above, it is often desirable to include on tags on-site information as the tags are attached to plants. For example, sequential numbers are sometimes included on tags to facilitate inventory control. Also, wholesalers or retailers often want to include their insignia or product number on a tag. Embossing the sequential number or insignia/product number on a tag is particularly desirable since the information can be overlaid onto the printed information on the tag without detracting from the printed indicia already on the tag. However, embossed tags are generally more expensive than traditional tags which are only printed on, and thus inventory control can be a problem. Further, it is generally very difficult to keep preprinted numerically sequenced tags in order, especially in the environment of a plant nursery. Still further, embossed tags make non-uniform stacks which are more difficult to reliably handle, and thus embossed tags are not conducive to automated application of tags to plants.

Thus, a tagging apparatus and method is desired solving the aforementioned problems.

SUMMARY OF THE INVENTION

In one aspect, the present invention includes an apparatus for tagging plants. The apparatus includes jaws for receiving a branch including surfaces for advancing a section of flexible strip in a loop around the branch, and a strip advancing mechanism for advancing the section of flexible strip onto the surfaces of the jaws. The apparatus further includes a tag advancing mechanism for advancing a tag into a position approximate the jaws, and a fastening mechanism for fastening the tag to the section of strip and for fastening the strip in a permanent loop around the branch. The apparatus still further includes a sequencer for actuating the jaws, the strip advancing mechanism, the tag advancing mechanism, and the fastening mechanism in a predetermined sequence. In a preferred form, an embossing die is positioned on the frame for embossing the tags immediately prior to positioning a tag in the jaws.

In another aspect, the present invention includes an apparatus for tagging plants including a frame, and jaws operably mounted on the frame for receiving a branch. The apparatus further includes an embossing die operably mounted on the frame for embossing a tag, and a tag advancing mechanism operably mounted on the frame for advancing a tag through the embossing die into a position approximate the jaws. A fastening mechanism is also provided for fastening the tag to a section of flexible strip for holding the tag permanently to the branch.

These and other features, advantages and objects of the present invention will be further understood and appreciated by those skilled in the art by reference to the following specification, claims and appended drawings.

BRIEF DESCRIPTION OF THE DRAWINGS

FIG. 16 is a perspective view of a second tagging apparatus embodying the present invention;

FIG. 17 is a perspective view of a tag retained to a branch by a looped section of flexible material, the tag including printed indicia and also including embossed indicia;

FIG. 18 is a cross-sectional view taken along the plane XVIII—XVIII in FIG. 17;

FIG. 19 is an enlarged fragmentary view of the circled area labelled as XIX in FIG. 18;

DETAILED DESCRIPTION OF THE PREFERRED EMBODIMENTS

Figure 1:
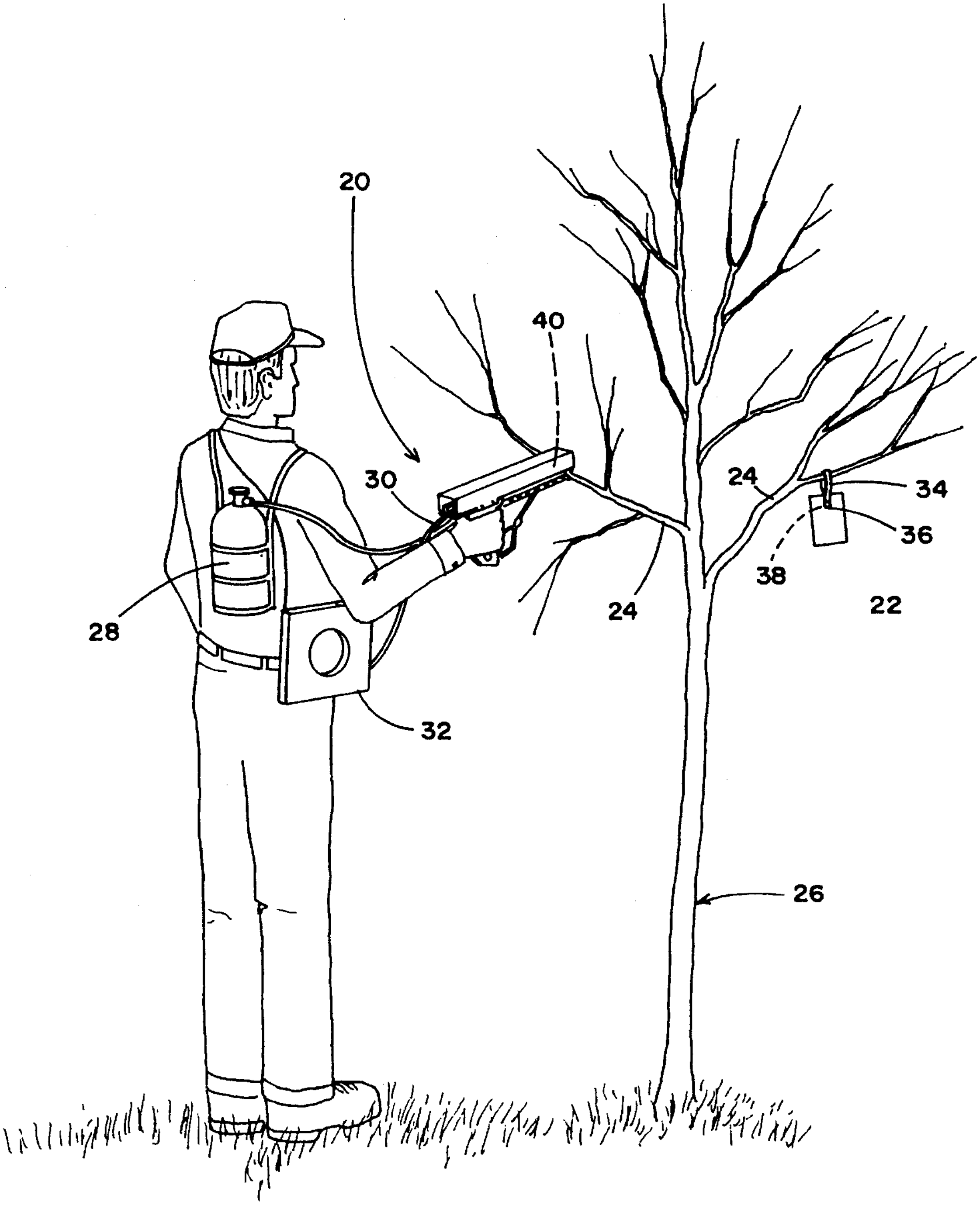
FIG. 1 is a perspective view of a plant tagging apparatus embodying the present invention as the apparatus is being used to attach a tag to a plant.

A plant tagging apparatus 20 (FIG. 1–2) embodying the present invention is provided for attaching tags 22 to a stem or branch 24 of a plant 26. Tagging apparatus 20 is essentially a portable hand-held gun powered by a portable power source such as compressed air tank 28. Tagging apparatus 20 is uniquely adapted so that it can be positioned proximate the plant branch 24 and actuated to automatically secure identification tag 22 to the plant without injuring the plant. Specifically, apparatus 20 is actuatable to hold tag 22 while drawing a flexible strip 30 from a roll of strip material 32 located remote frown apparatus 20. Strip 30 is extended around the branch 24 to form a loop 34 with the loop ends 36 and 38 positioned proximate the tag 22. Apparatus 20 is further provided with a cutting and stapling mechanism 40 to cut strip 30 from roll 32, and staple tag 22 to the ends of strip 30. Thus, by actuating tagging apparatus 20, a tag 22 is quickly, efficiently and permanently secured to plant 26 without injuring the plant.

It is contemplated that tag 22 will be a preprinted identification tag such as is commonly used to not only identify a selected plant, but also to give planting and care instructions. Preferably, tag 22 (FIGS. 2 and 3) will be made of a flexible but durable and relatively stiff material such as a UV stabilized polymeric material. Flexible strip 30 will also preferably be made frown a flexible but durable polymeric material. In particular, strip 30 must have enough longitudinal stiffness to permit the strip to be advanced without folding and bunching, however strip 30 must be flexible enough to permit it to flex around branch 24 into the shape of a loop as it is being extended. For example, it is contemplated that a UV stabilized polyolefin polymer will work in this application. Notably, the present arrangement allows the strip 30 to be chosen from a less expensive material while tag 22 is chosen from a more expensive material optimally suited for printing and appearance. A staple 42 is stapled through strip ends 36 and 38 and also tag 22 to secure same together.

Figure 15:
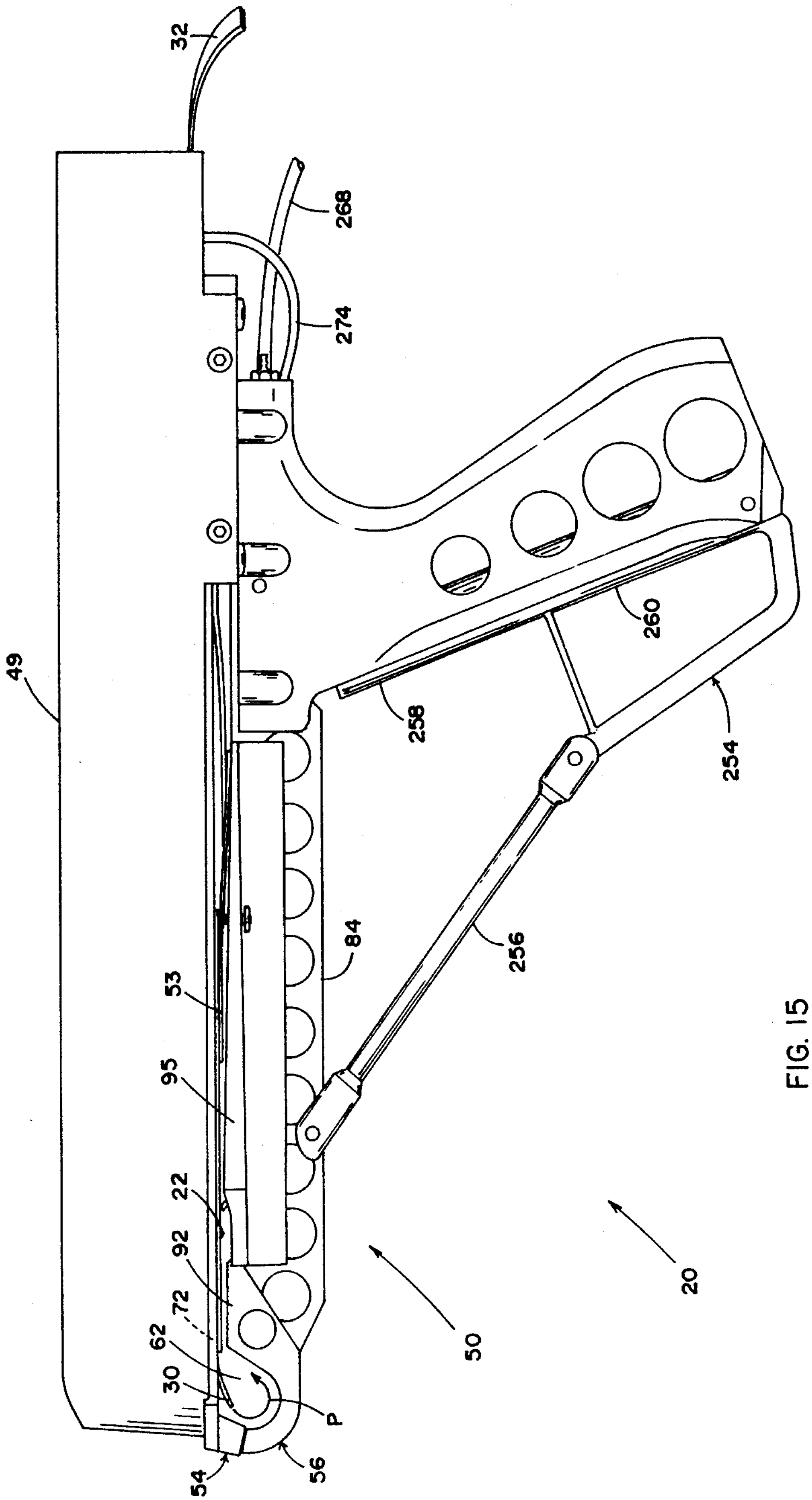
FIG. 15 is a side view of the tagging apparatus with the lower jaw fully closed and the trigger actuated to extend the strip and staple same to the tag.

Apparatus 20 (FIGS. 4–15) includes an upper frame member 48 covered by a shield 49 and a lower holding/clamping member 50 pivotally connected to the frame member 48 at pivot 52. A leaf spring 53 is secured to lower member 50 for frictionally holding tag 22 as lower member 50 is moved toward upper member 48. The front of frame member 48 forms an upper jaw 54 and the front end of frame member 48 forms a mating lower jaw 56, with lower jaw 56 being adapted to mateably close against upper jaw 54. Jaws 54 and 56 include surfaces 58 and 60 respectively that form a teardrop-shaped opening 62 when jaws 54 and 56 are closed together (FIG. 15). Opening 62 has a predetermined size so that it can receive and enclose plant branch 24.

Upper frame member 48 (FIG. 7) includes an elongated generally planar beam 66. Beam 66 includes a front end 68 and a rear end 70, front end 68 having a hole 72 therein spaced from its extreme end 74. A strip-carrying channel 76 extends the length of beam 66 from rear end 70 to hole 72 on the top side of beam 66. A tooth-like member 78 extends downwardly from the bottom of front end 68 between extreme end 74 and hole 72. Tooth-like member 78 and front end 68 form upper jaw 54. A curvilinear channel-like surface 80 is formed in tooth-like member 78. Surface 80 aligns with channel 76 so that the leading end 36 of a strip of material 30 extended along first channel 76 and advanced through hole 72 naturally follows second channel 80. Also, a plate 82 mounts to beam 66 fully covering channel 76 adjacent hole 72 and partially covering channel 76 along the rest of channel 76. Plate 82 extends substantially the length of channel 76 helping to support strip 30 and prevent buckling as the strip is extended forwardly in channel 76.

Lower holding/clamping member 50 (FIG. 14) includes an elongated beam 84 with holes 86 bored therein for reduced weight. Lower jaw 56 is formed at the front end of beam 84. A finger 88 extends forward of lower jaw 56. The extreme end of finger 88 includes a protrusion 89 that engages a recess 91 in tooth-like member 78 to align lower jaw 56 with upper jaw 54 as jaws 54 and 56 are closed. The inner concave surface of finger 88 defines a channel 90.

Channel 90 aligns with channels 76 and 80 to form a substantially continuous channel that extends around teardrop-shaped opening 62. The continuous channel is adapted to cause strip 30 to extend in a loop back onto itself as strip 30 is extended. With tag 22 held between jaws 54 and 56 by leaf spring 53 (FIG. 15), the leading end of strip 32 is advanced along path P to one side of tag 22 with the trailing end being located on the opposite side of tag 22.

Figure 2:
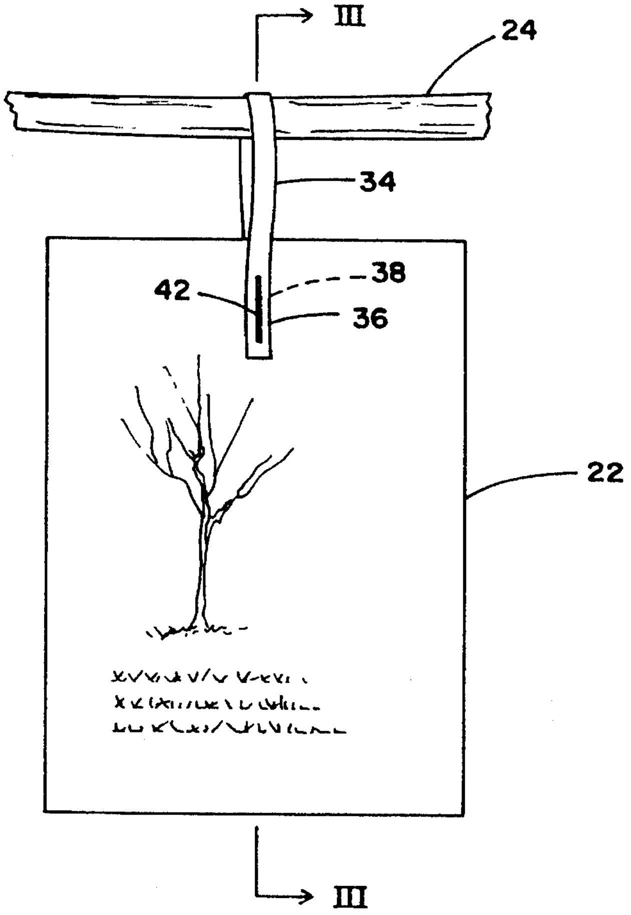
FIG. 2 it a side view of an attaching strip looped around a plant branch and stapled to a tag.
Figure 3:
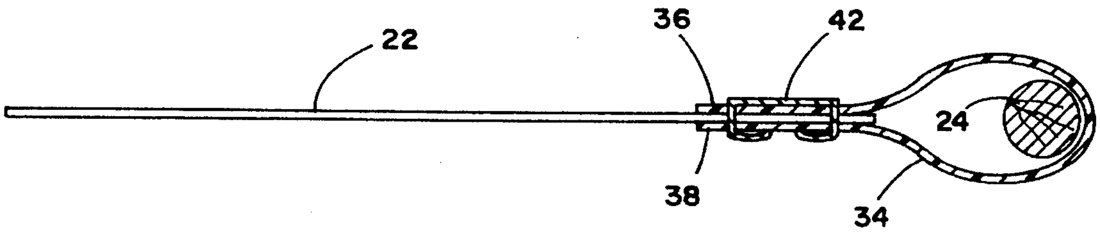
FIG. 3 is a sectional view taken along the plane III—III in FIG. 2.

An anvil 92 is positioned on lower beam 84 below upper beam hole 72 and behind teardrop-shaped hole 62. Anvil 92 includes an upper surface adapted to crimp the ends of a selected staple 42 as the staple is driven through strip ends 36 and 38 and tag 22 (FIGS. 2 and 3). Anvil 92 also extends rearwardly so that it forms a support 95 for tag 22 during the operation of tagging apparatus 20.

Figures 5, 6:
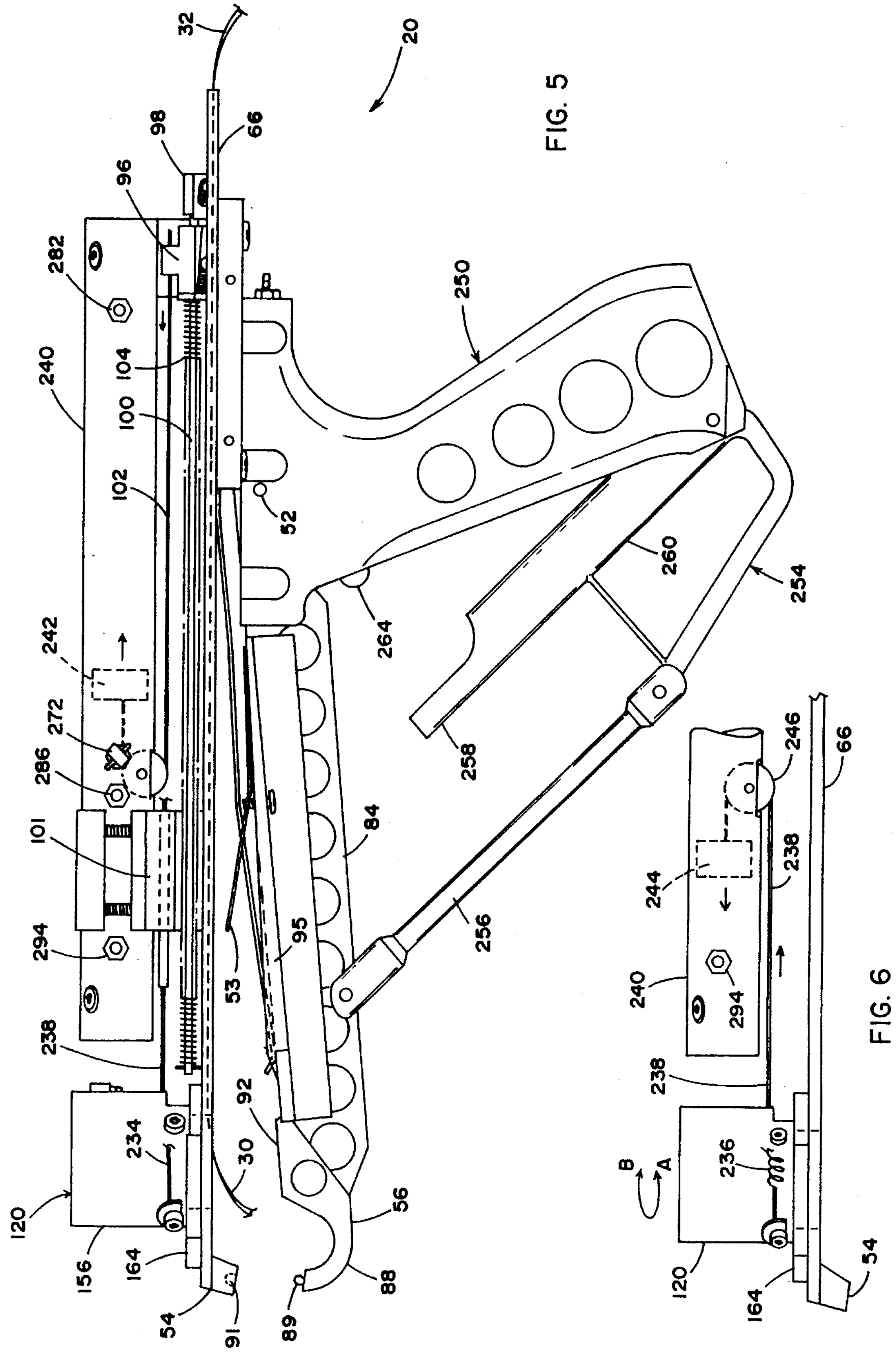
FIG. 5 is the same view as FIG. 4 with the cover and the staple magazine removed.
FIG. 6 is a partially broken-away side view of the stapler head and the stapler-head-actuating mechanism.
Figure 7:
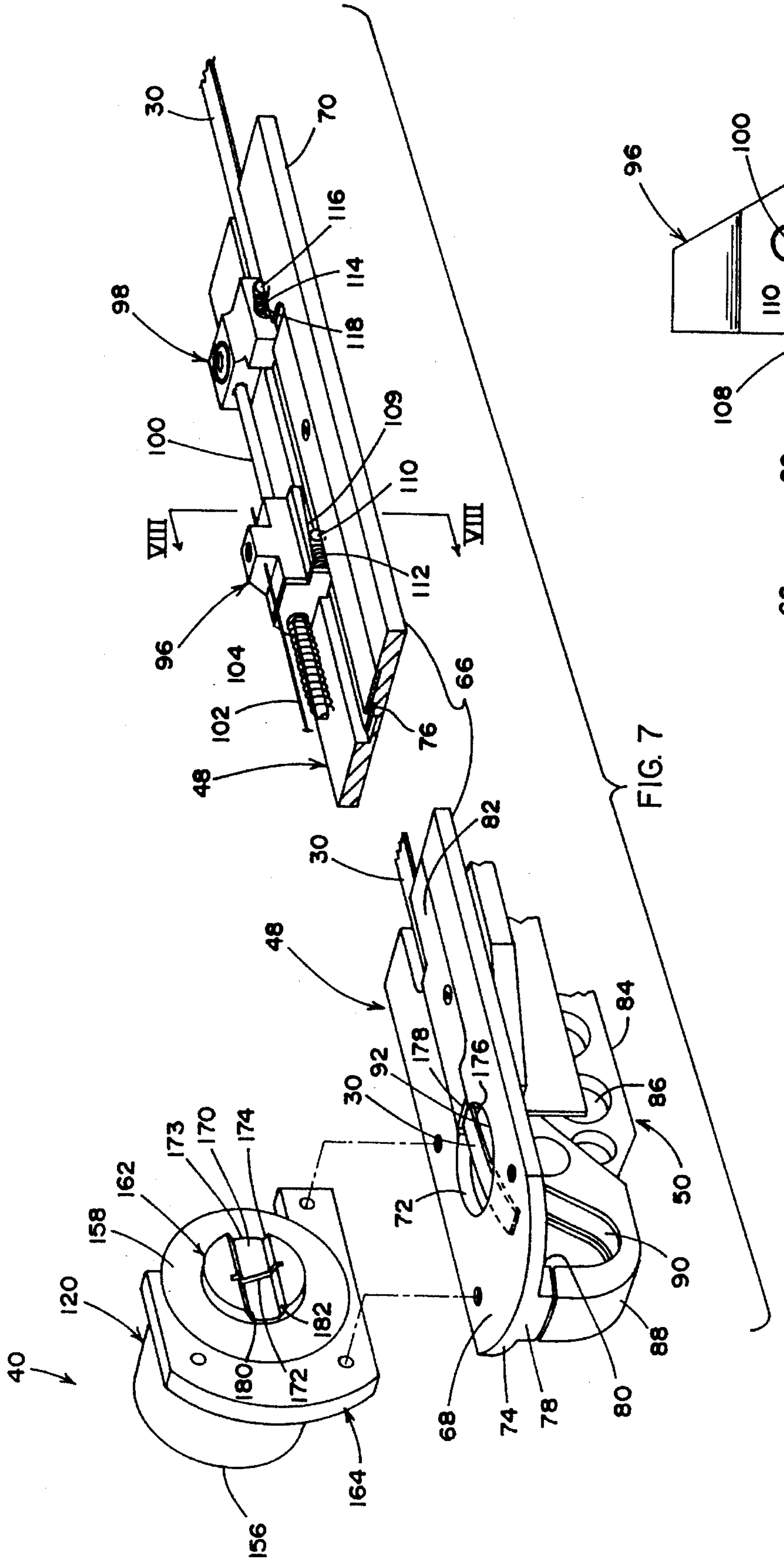
FIG. 7 is a perspective view of the strip material advancing mechanism with the stapler head exploded away.
Figure 8:
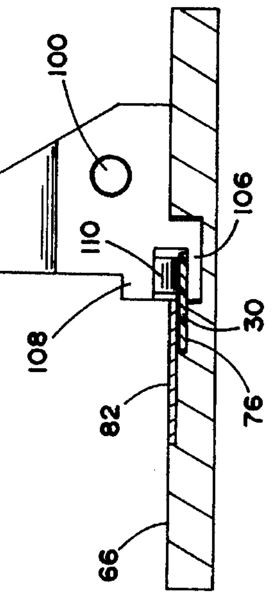
FIG. 8 is a cross-sectional view taken along the plane VIII—VIII in FIG. 7.

A pair of grippers 96 and 98 (FIG. 7) are operably attached to the top of upper beam 66 near rear end 70. Front gripper 96 is movably mounted on a guide rod 100 that extends between rear gripper 98 and a stand 101 (FIG. 5). A pull cable 102 (FIG. 7) is connected to gripper 96 for pulling gripper 96 forwardly, and a push coil spring 104 is mounted on rod 100 for spring-biasing gripper 96 toward the home position. An elongated "L"-shaped leg 106 extends downwardly from gripper 96 into channel 76 under strip 30 (FIG. 8). An upper elongated leg 108 extends laterally from gripper 96 over L-shaped leg 106, upper leg 108 including a rearwardly angled lower surface that forms a recess 109 having a narrow rear end (FIG. 7). A peg-shaped friction grip 110 is positioned on strip 30 in the recess 109, friction grip 110 being biased toward the narrow rear end of the recess 109 by a spring 112. As cable 102 is pulled, grip 110 binds in the narrow end of the recess causing strip 30 to be drawn forward with gripper 96 following channel 76.

Once strip 30 is fully advanced forwardly, rear gripper 98 holds strip 30 from moving as front gripper 98 is moved back to the home position by spring 104. As front gripper 96 is moved rearwardly, friction grip 110 moves to the larger end of the recess 109 thus allowing friction grip 110 to slide over strip 30 during the rearwardly movement. Rear gripper 98 is securely stationarily mounted to rear end 70 of upper beam 66. Rear gripper 98 includes a recess 114, a peg-like friction grip 116 and a bias spring 118 that function comparably to front gripper components 109, 110 and 112, respectively. The co-action of grippers 96 and 98 allow strip 30 to be advanced a predetermined amount and then held as the strip is stapled to tag 22.

Figure 9:
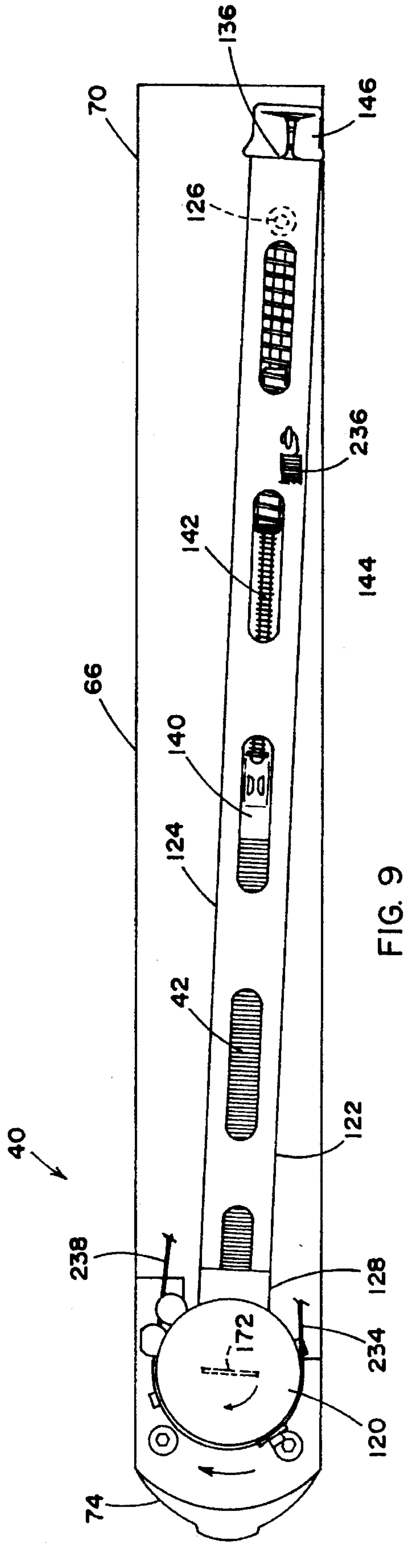
FIG. 9 is a top view of the stapler mechanism and frame, with other components removed, shown in the home position.
Figure 10:
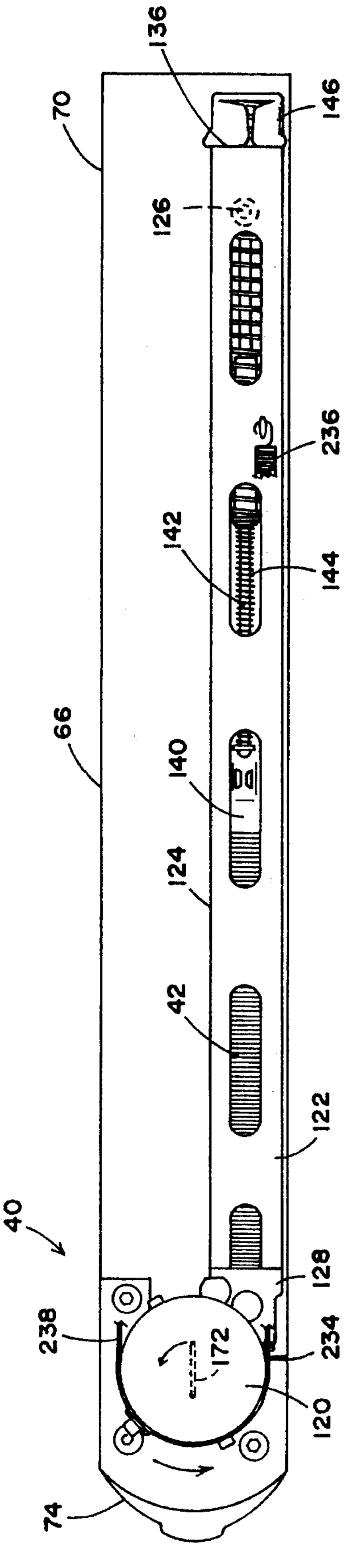
FIG. 10 is the same view as FIG. 9 but with the stapler mechanism rotated to the staple driving position.
Figure 11:
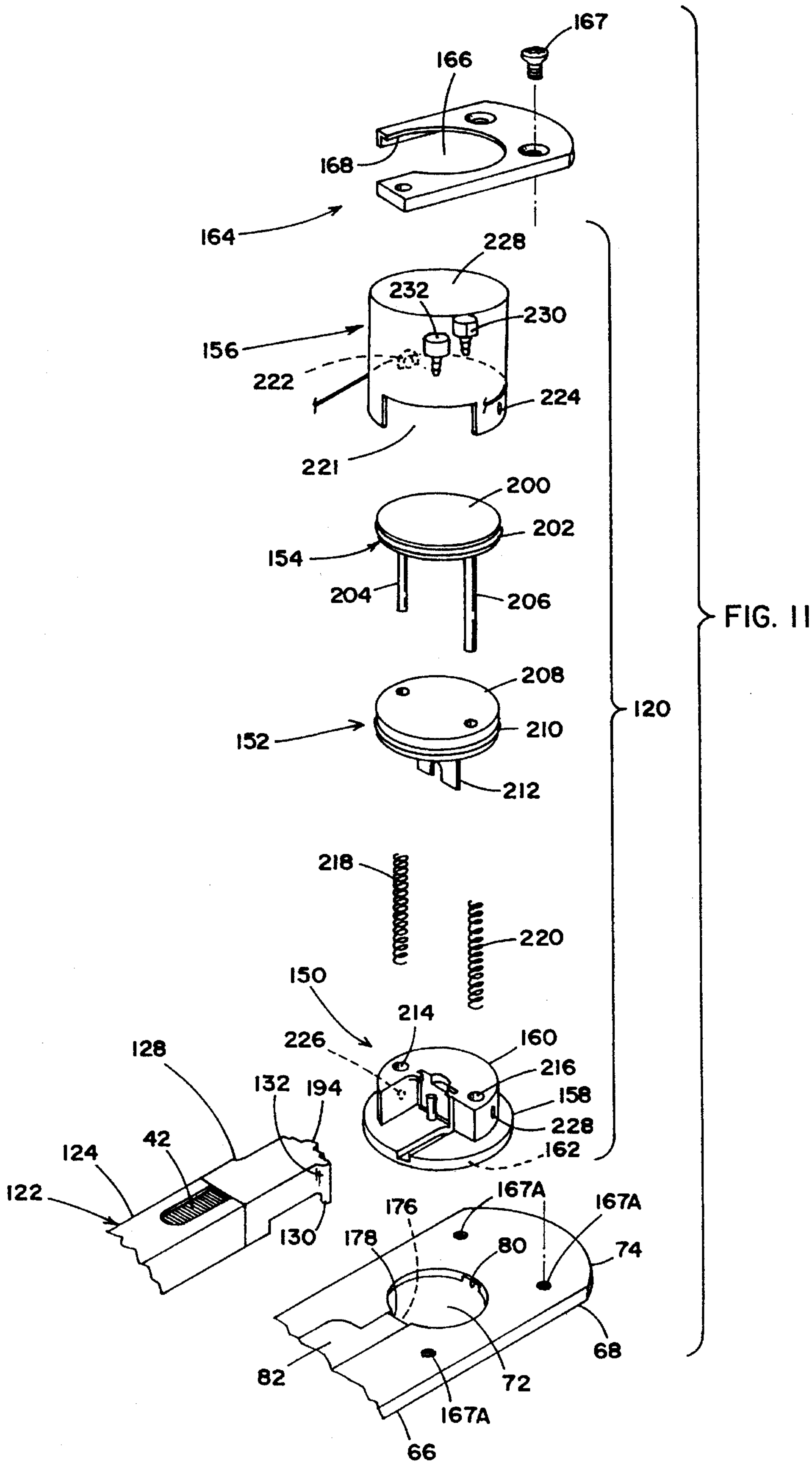
FIG. 11 is an exploded perspective view of the stapler mechanism including the front of the frame and the mounting bracket for securing the stapler mechanism to the frame front.

Stapler mechanism 40 includes a stapler head 120 (FIGS. 7 and 11) and a stapler magazine 122 filled with staples 42 (FIGS. 9 and 10). Stapler magazine 122 (FIGS. 9 and 10) includes a rectangular tubular sleeve 124 pivotally mounted to the top of upper beam 66 at pivot 126. The front end of magazine 122 includes an adapter 128 with a pivot/slide pin 130 (FIG. 11) projecting downwardly at the front right corner 132 of adapter 128. Stapler head 120 is rotatably mounted in hole 72. A groove 134 in stapler head 120 operably receives pin 130 so that stapler magazine 122 rotates with stapler head 120 as stapler head 120 is rotated between a home position (FIG. 9) and a stapling position (FIG. 10). Stapler magazine 122 can be loaded from end 136, which mateably receives a plunger 140, a push rod 142, a bias spring 144, and an end plug 146 for managing staples placed therein.

Stapler head 120 (FIG. 11) includes a rotatable base 150 to which a staple-driving pneumatically-operated piston 152, a staple-pickup pneumatically-operated piston 154 and a cylinder 156 are operably mounted. In particular, base 150 (FIG. **11*a*) includes a central disc 158 from which a staple-managing upper die block 160 extends upwardly and a staple guide strip-cutting lower: die block 162 (FIG. 7) extends downwardly. A retaining plate 164 (FIG. 11.) includes an opening 166 adapted to fit over cylinder 156 (and upper die block 160). The lower surface 168 of retaining plate 164 defines a recess for rotatably receiving the perimeter of disc 158 so that when retaining plate 164 is secured to the front end 68 of upper beam 66, base 150 is rotatably mounted on beam 66 with lower die block 162 extending through hole 72. Screws 167 secure retaining plate 164 to upper beam 66 by engaging holes 167*a* in beam 66**.

Lower die block 162 (FIG. 7) is generally disc-like in shape. A channel 170 extends transversely across the lower surface of lower, die block 162. A staple guide slot 172 extends vertically through stapler head 150. Staple guide slot 172 is centrally located on lower die block 162 and the width of staple guide slot 172 extends across channel 170. The inlet 173 to channel 170 includes a sharpened edge 174 adapted to cut strip 30 as stapler head 120 is rotated, with sharp edge 174 cutting against the adjacent surfaces 176 on upper beam 66 and also on the front edge 178 on retainer plate 82. Notably, the sides 180 and 182 of channel 170 are angled so that strip 30 is forced out of channel 170 as stapler head 120 is rotated. This prevents the trailing end 38 of strip 30 from jamming or being carried out of position as stapler head 120 is rotated and strip 30 is cut from roll 32.

Figure 11A:
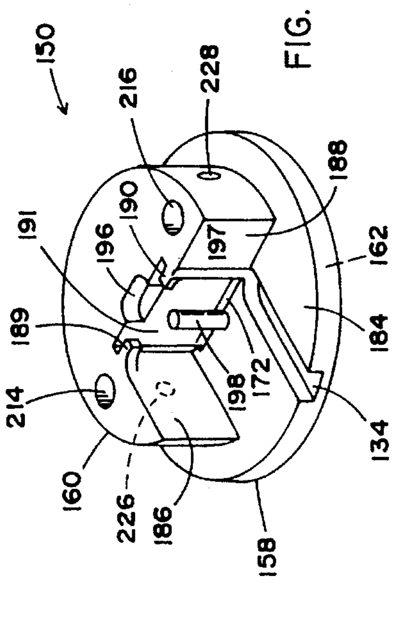
FIG. 11*a* is an enlarged perspective view of the stapler head base shown in FIG. 11.
Figure 13:
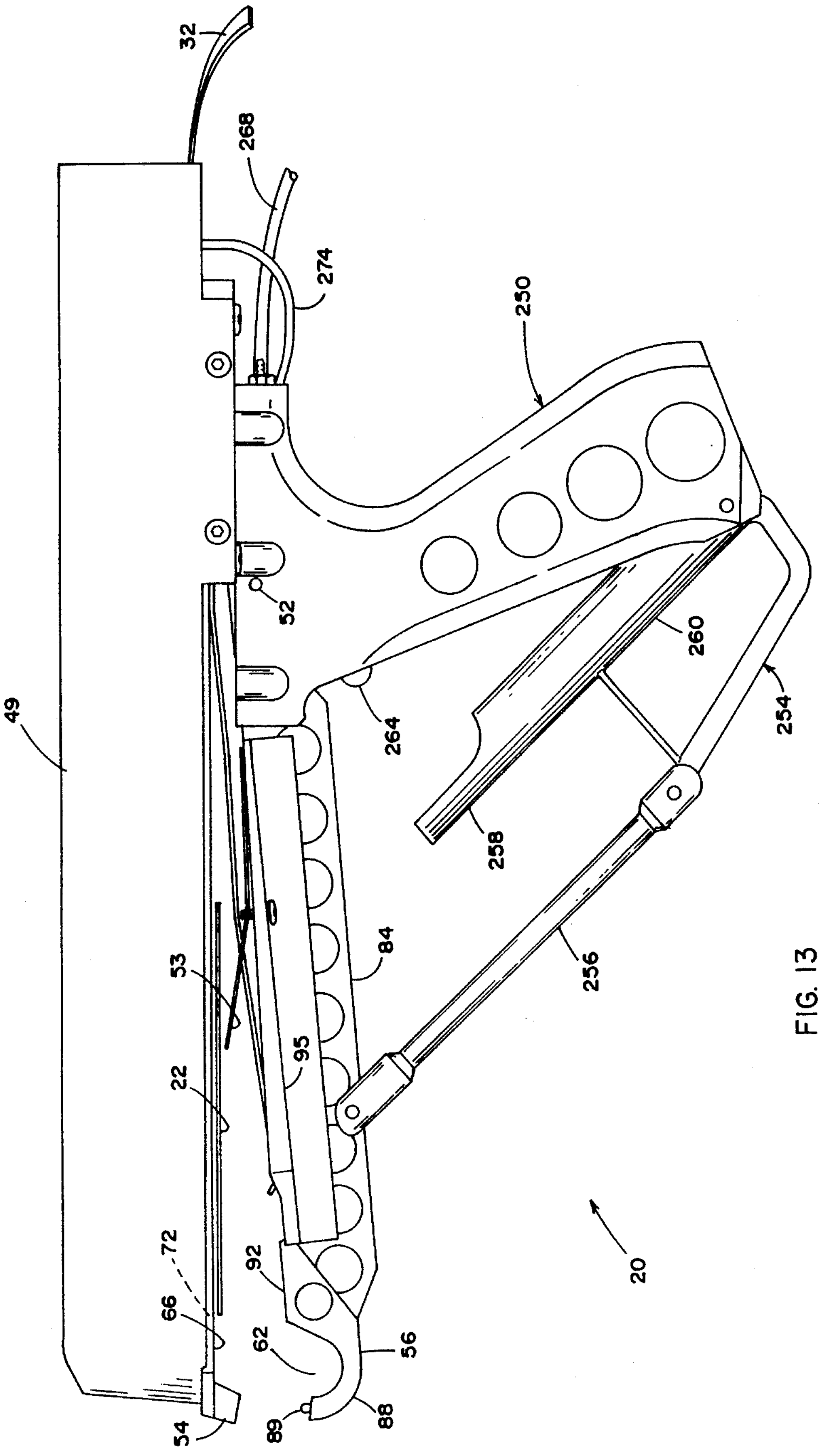
FIG. 13 is a side view of the tagging apparatus in the home position with a tag positioned in the tagging apparatus.
Figure 14:
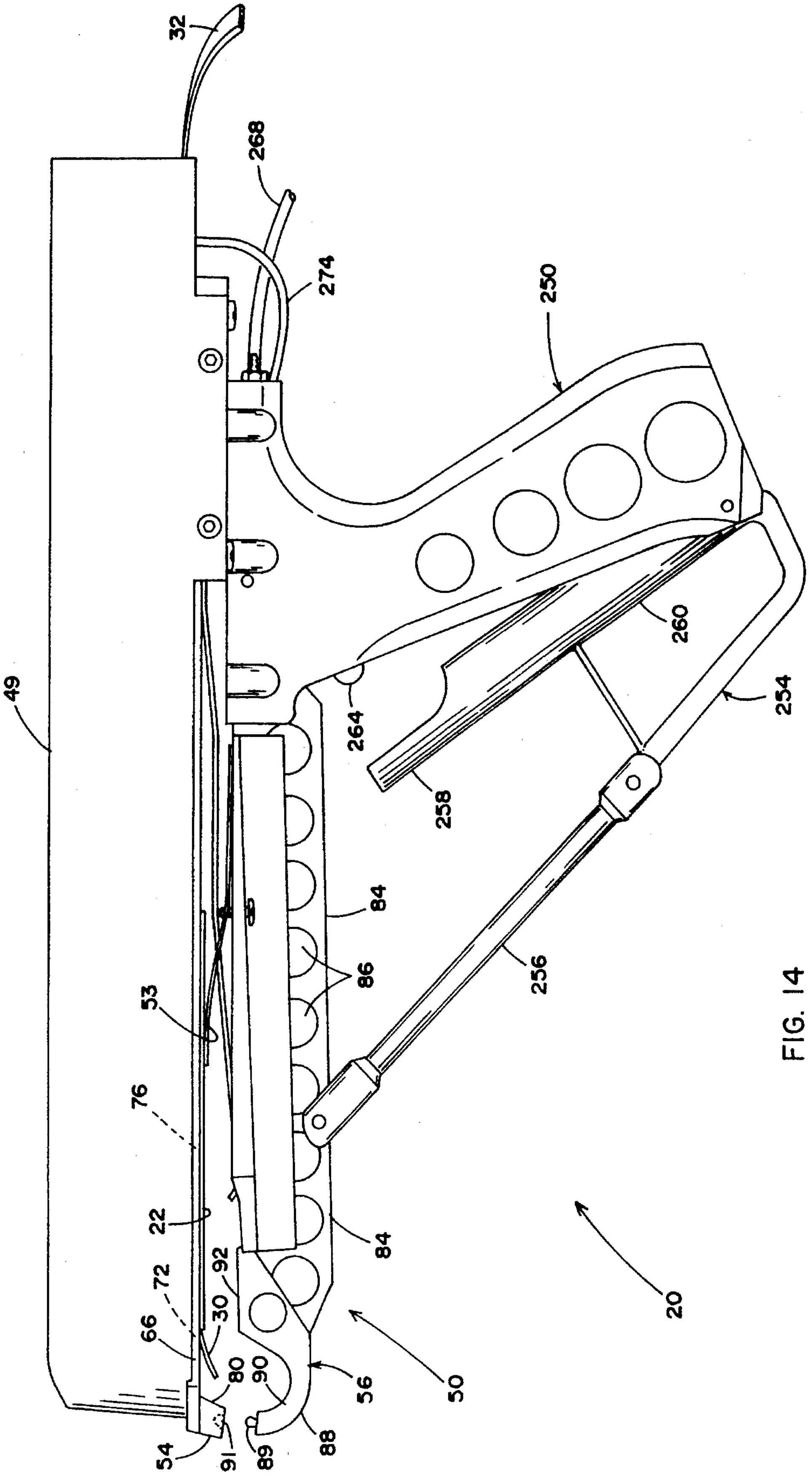
FIG. 14 is a side view of the tagging apparatus with the lower jaw partially closed and thus holding the tag.

Disc 158 (FIG. **11*a*) includes an upper surface 184 with the grove 134 defined therein. Upper die block 160 extends upwardly at least the height of stapler magazine 122. Upper die block 160 defines perpendicular surfaces 186 and 188. A surface 191 on upper die block 160 defines the rear side of staple guide slot 172. Stirface 191 is generally parallel surface 188. Opposing protrusions 189 and 190 extends inwardly toward each other at the top of staple guide slot 172, the rear side of protrusions 189 and 190 forming an upper part of staple-guiding slot 172 with surface 191, and the front side of protrusions 189 and 190 forming a surface generally parallel to surface 188. The end of stapler magazine adapter 128 rests against protrusions 190 and 192 and surfaces 186 and 188 when in the home position (FIG. 9). Adapter 128 further includes a centering protrusion 194 (FIG. 11) that mateably engages recess 196 (FIG. 11*a*) in upper die block 160 when in the rest position. Also, pivot pin 130 rests in a depression 197 in surface 188 when in the rest position. A staple guide pin 198 extends upwardly from base disc 158 in a position spaced from surface 191 to further define staple guide slot 172**.

Staple-pickup piston 154 (FIG. 11) includes a piston section 200 with "O"-ring seal 202 located around its perimeter and further includes two spaced parallel guide rods 204 and 206 extending perpendicular to the face of piston section 200. Staple-driving piston 152 includes a piston section 208 with an "O"-ring seal 210 located around its perimeter and further includes a stapler-driving blade 212 extending perpendicular from piston section 208. Stapler blade 212 is adapted to slidingly fit within staple guide slot 172, and is sufficiently long so that it extends fully through base 150 (i.e. upper die block 160, disc 158, and lower die block 162) when staple-driving piston 152 is pressed against the top of upper die block 160.

Upper die block 160 is configured with a pair of spaced holes 214 and 216 adapted to slidingly receive guide rods 204 and 206. A pair of coil springs 218 and 220 are positioned on guide rods 204 and 206 respectively with springs 218 being located partially in upper die block holes 214 and 216 and between disc 158 and staple-driving piston 152.

Stapler head cylinder 156 (FIG. 11) is configured to retain pistons 152 and 154 to base 150. The lower end of cylinder 156 includes a notch 221 shaped to operably receive stapler magazine adapter 128. Notch 221 is enlarged so that magazine adapter 128 can operably move between the home position (FIG. 9) and the stapling position (FIG. 10). A pair of holes 222 and 224 are drilled in cylinder 156 along the lower edge of cylinder 156, holes 222 and 224 aligning with corresponding holes 226 and 228 in upper die block 160 to permit secure attachment to base 150 by screws (not shown).

The upper end of cylinder 156 is closed by an end panel 228. A pair of compressed air inlets 230 and 232 are positioned in the sidewall of cylinder 156. The upper air inlet 230 is positioned near end panel 228 so that when compressed air is introduced, the compressed air drives staple-pickup piston 154 downwardly until guide rods 204 and 206 bottom-out in holes 214 and 216 in upper die block 160. The lower air inlet 232 is positioned so that when compressed air is introduced with piston 154 driven fully down, air is introduced between piston 152 and 154 such that staple-driving piston 152 is driven downwardly until piston 152 engages upper die block 160. When the compressed air is vented, springs 218 and 220 bias pistons 152 and 154 upwardly to the home position.

A pull cable 234 (FIG. 12) is attached to stapler head 120 such as at the screw in hole 222. Pull cable 234 is attached to a spring 236 that in turn is attached to a stable place such as staple magazine sleeve 124. Pull cable 234 and spring 236 rotatingly bias stapler head 120 to the home position in direction A. (See also FIGS. 6 and 9.) A second pull cable 238 extends around cylinder 156 in a direction opposite pull cable 234. Second pull cable 238 is adapted to rotate stapler head 120 to the stapling position when pulled.

The actuating and powering mechanism for tagging apparatus 20 (FIG. 12) includes a tubular cylinder 240, and a pair of independent pistons 242 and 244 operably mounted in cylinder 240. Piston 242 is the strip-advancing piston, and piston 244 is the stapler-head-rotating piston. A rotatable pulley 246 is operably mounted in the sidewall of cylinder 240 about one-third of the way along cylinder 240. The top of pulley 246 lies proximate the center of tubular cylinder 240 and the bottom of pulley 246 lies outside of the sidewall of tubular cylinder 240. Actuating cable 102 of strip gripper 96 extends around pulley 246 and connects to piston 242. Actuating cable 238 of stapler head 120 extends around pulley 246 and connects to piston 244. Pulley 246 is made so that it permits cables 102 and 238 to slide over pulley 246, thus allowing a single common pulley 246 to be used. Alternatively, it is contemplated that separate pulleys could be used for each cable.

Figure 4:
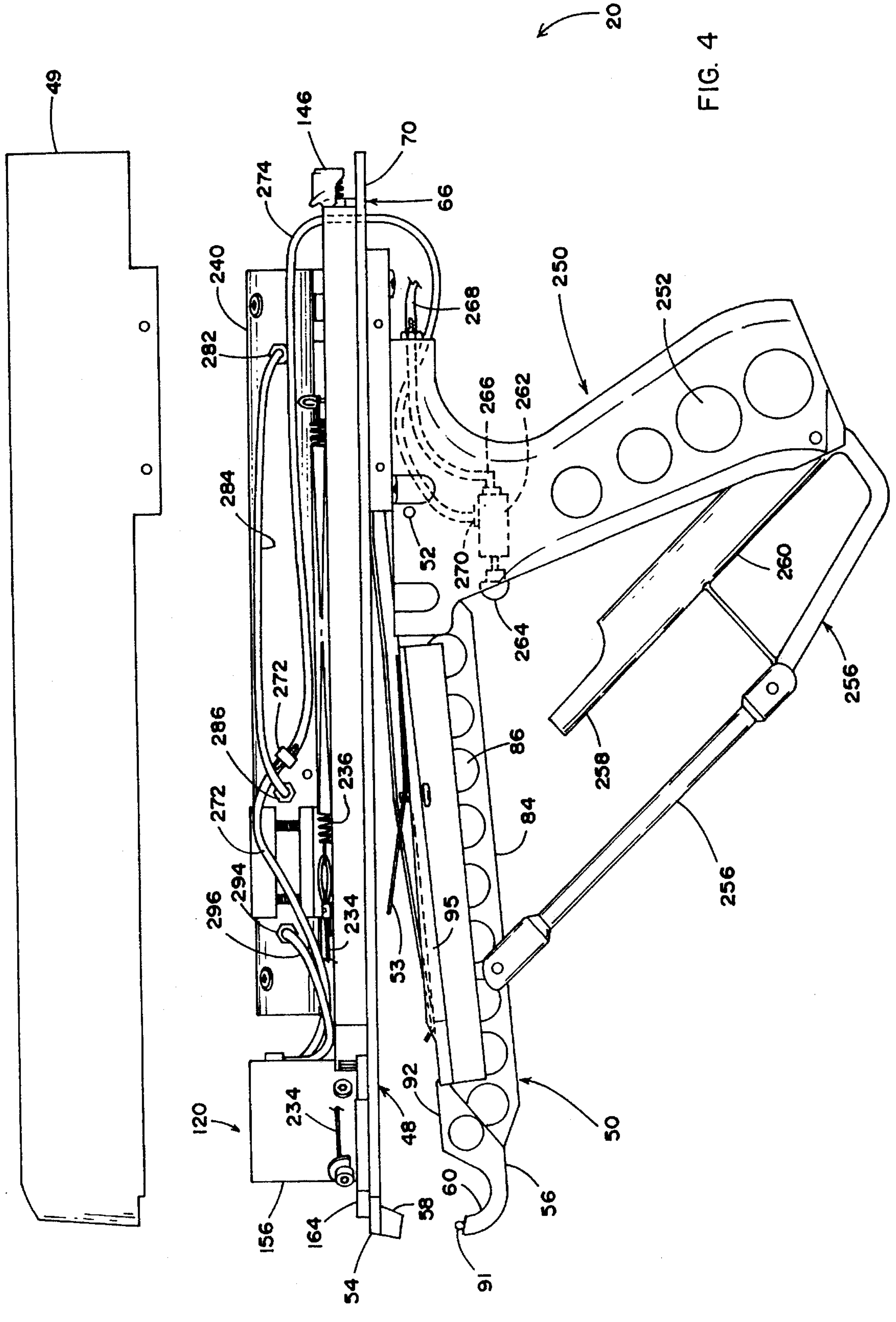
FIG. 4 is a side view of the tagging apparatus shown in FIG. 1 with the cover exploded away.

A handle 250 (FIG. 4) is mounted to the bottom of rear end 70 of upper beam 66. Handle 250 forms a piston-like grip readily adapted for grasping by a person's hand. Holes 252 are cut into handle 250 as desired to reduce weight. A trigger 254 is pivotally attached to the bottom of handle 250. A link 256 operably connects trigger 254 to lower member 50 so that as trigger 254 is partially squeezed (FIG. 14), lower member 50 is pressed against upper frame member 48. A protrusion 258 extends upwardly from the finger-receiving portion 260 of trigger 254. A push-operated valve 262 is mounted in handle 250 so that as trigger 254 reaches the fully depressed "firing" position (FIG. 15), protrusion 258 engages plunger 264 on valve 262 to open valve 262 (FIG. 4).

The actuating mechanism of tagging apparatus 20 is interconnected to the components of tagging apparatus 20 in the following manner. Compressed air tank 28 (FIG. 12) is connected to the air inlet 266 on valve 262 by a tube 268. The air outlet 270 of valve 262 is connected to a "T" connector 272 on tubular cylinder 240 by a tube 274. Air is communicated from T connector 272 to an enclosed area 276 in cylinder 240 by passageway 278 that extends through wall 280. Enclosed area 276 is bounded on one end by strip-advancing piston 242 and at the other end by wall 280. A tube 281 also communicates air from T connector 272 to air inlet 230 on stapler head cylinder 156 to thus drive piston (154) downwardly to select or "pick" a staple. The selected staple is shoved partially into staple-guiding slot 172 (FIG. 11*a*) where the staple is located between staple guide pin 198 and surface 191. The selected staple is held in that position as stapler head 120 is rotated as described below.

Figure 12:
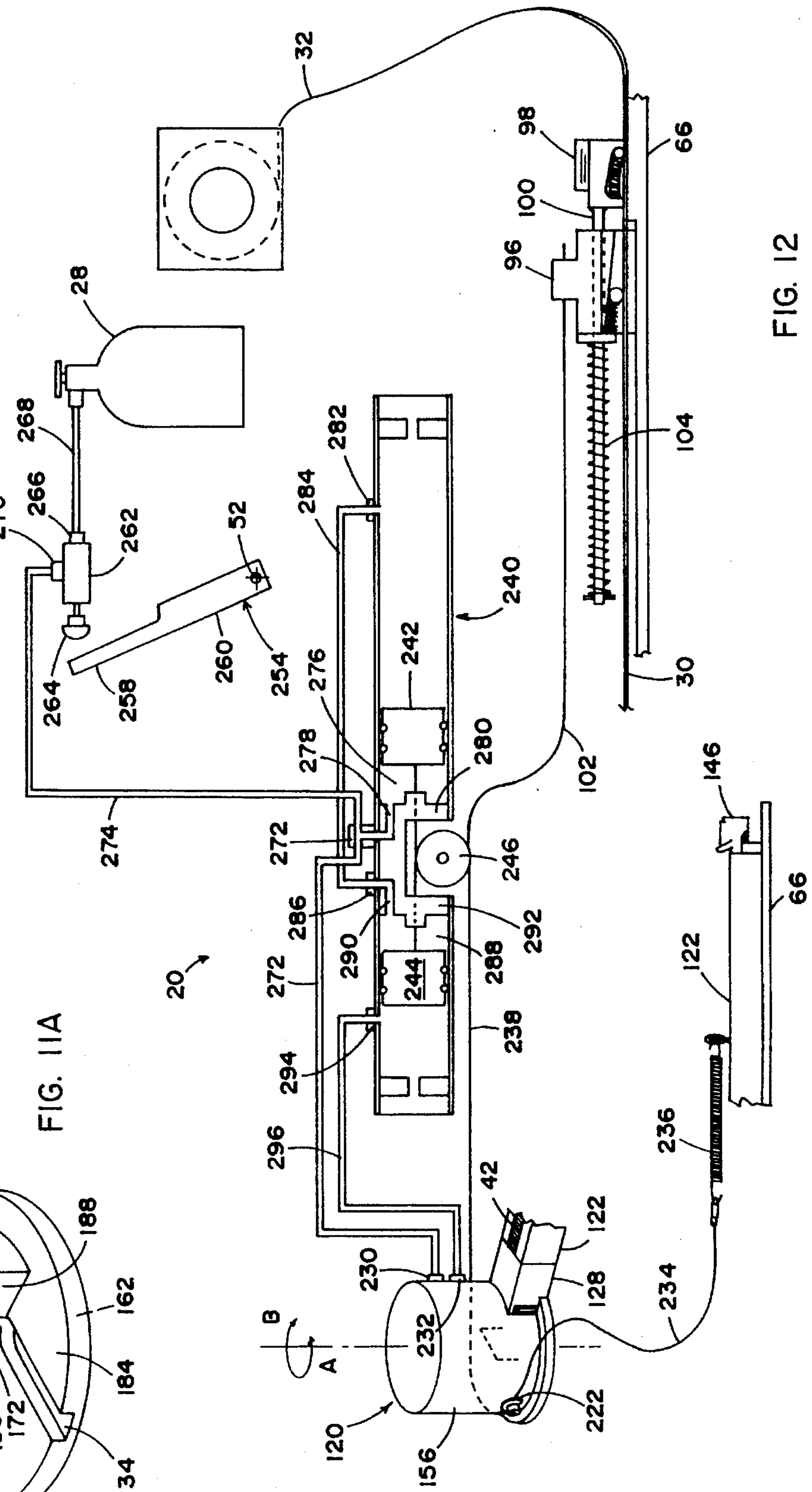
FIG. 12 is a schematic diagram illustrating the actuating mechanism for the strip advancing system and the stapling mechanism, and also the sequencing method therefor.

As piston 242 is moved to a fully advanced position, piston 242 passes an air outlet 282 in cylinder 240 (FIG. 12). A tube 284 communicates air from air outlet 282 to air inlet 286 also in cylinder 240. Air is communicated from air inlet 286 to an enclosed area 288 in cylinder 240 by passageway 290 that extends through wall 292. Enclosed area 288 is bounded on one end by stapler-head-rotating piston 244 and at the other end by wall 292. As stapler-head-rotating piston 244 is moved to a fully advanced position, piston 244 passes an air outlet 294 in cylinder 240. A tube 296 communicates air from air outlet 294 to air inlet 232 on stapler head cylinder 156, thus actuating stapler-driving piston 152 to drive the selected staple through strip ends 36 and 38 and tag 22. The actuating systems remains at this position until trigger 254 is released and valve 262 is closed. At such time, valve 262 is vented and pistons 292 and 244 are returned to the home position by springs 118 and 236, respectively (FIG. 12) and pistons 242 and 244 are returned to the home positions by springs 104 and 236.

The present embodiment is pneumatically powered, although it is specifically contemplated that other means such as a battery powered or even a gas powered system are within the scope of this invention.

Thus, a tagging apparatus for efficiently and automatically extending a flexible strip around a branch or stem, and for automatically securing a tag to the strip and in turn to the branch/stem is provided. Optimally, the tagging apparatus is a pneumatically powered hand-held unit adapted to hold and staple an identification tag to tire branch/stem by use of a looped flexible strip.

A second apparatus 320 (FIG. 16) embodying the present invention is adapted for tagging plants. For purposes of description of apparatus 320, the terms "upper," "lower," "right," "left," "rear," "front," "vertical," "horizontal," and derivatives thereof shall relate to the invention as oriented from the operator's perspective as shown in FIG. 16. In other words, the front of the machine is adjacent the operator. However, it is to be understood that the invention may assume various alternative orientations except where expressly specified to tire contrary. It is also to be understood that the specific devices and processes illustrated in the attached drawings, and described in the following materials are simply exemplary of tire inventive concepts defined in the appended claims. Hence, specific dimensions and other physical characteristics relating to the embodiments herein are not to be considered as limiting unless the claims expressly state otherwise.

Figure 20:
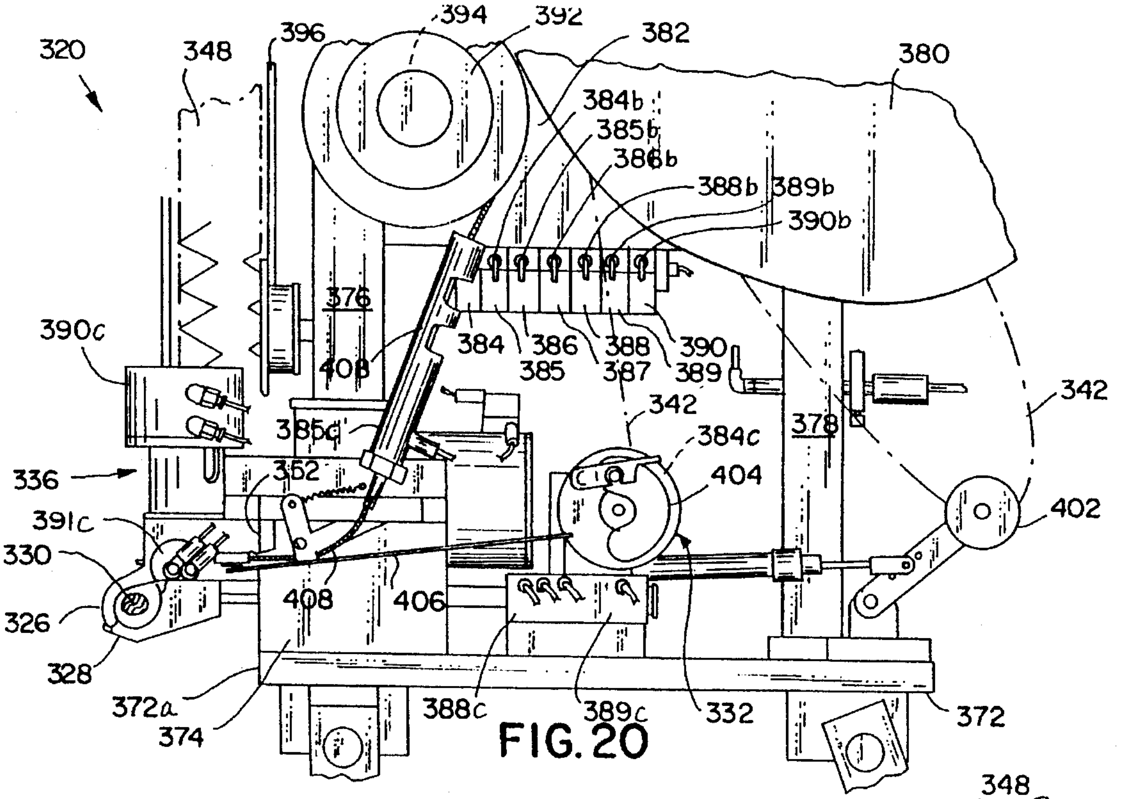
FIG. 20 is an enlarged, fragmentary, side-elevational view, taken in direction A, of the apparatus shown in FIG. 16, the side being the right-hand side of the apparatus based on the position of the operator in FIG. 16.
Figure 21:
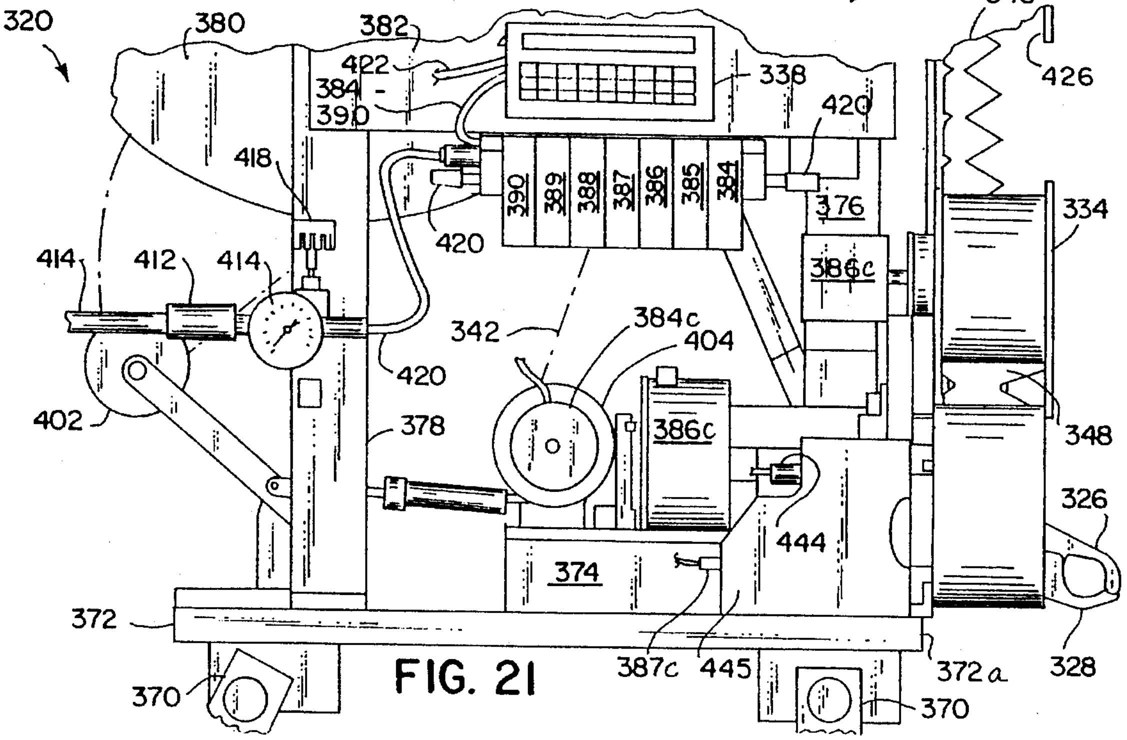
FIG. 21 is an enlarged, fragmentary, side-elevational view, taken in direction B, of the apparatus shown in FIG. 16 the side being the left-hand side based on the position of the operator in FIG. 16.
Figure 22:
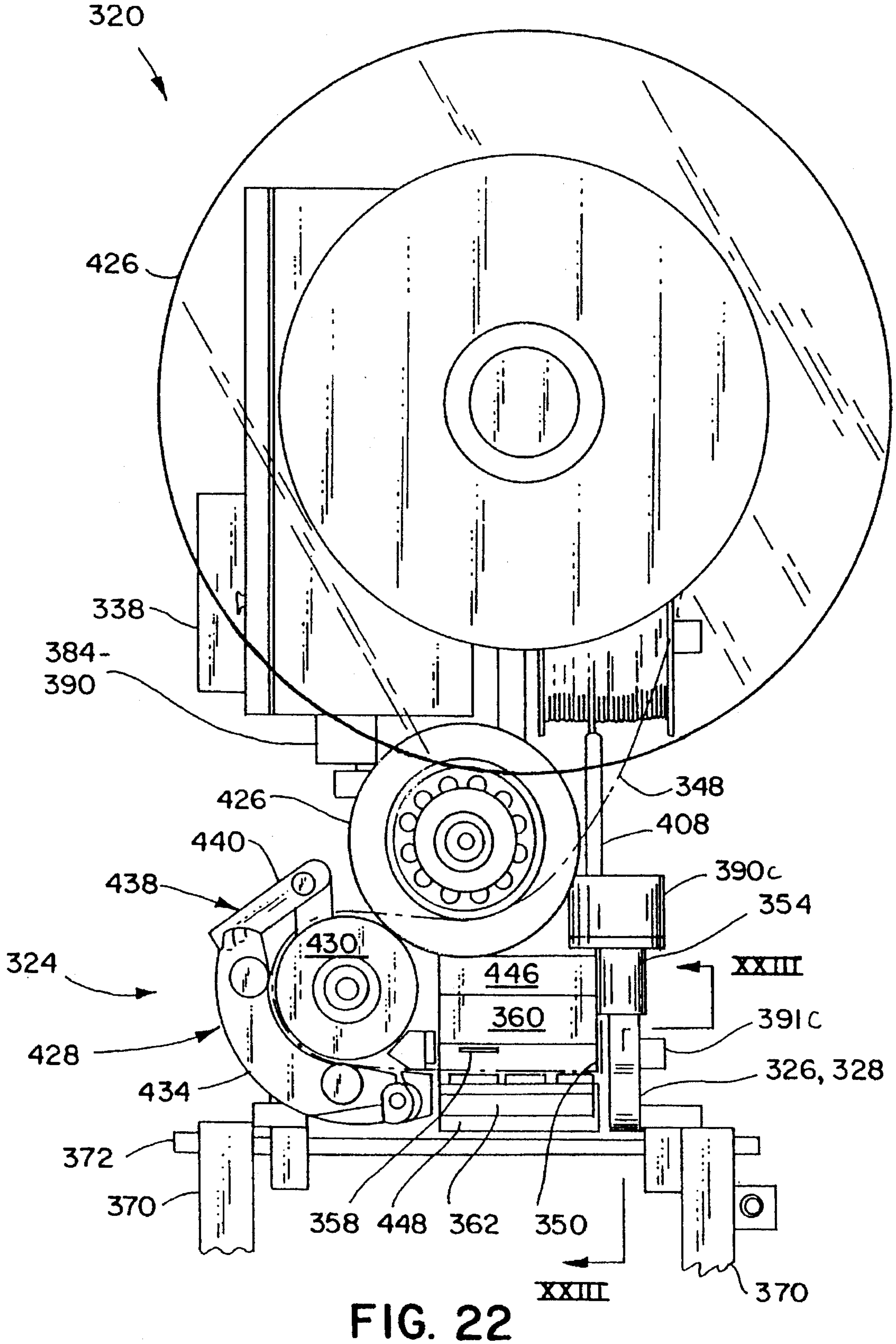
FIG. 22 is an enlarged, fragmentary, front view of the apparatus shown in FIG. 16.
Figure 26:
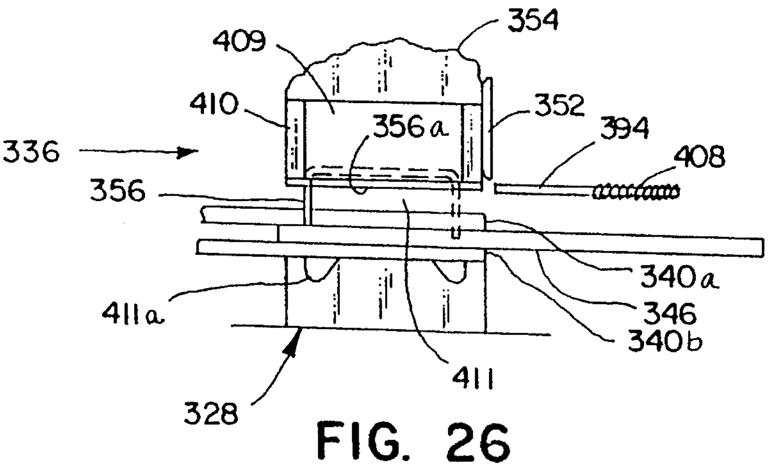
FIG. 26 is a schematic showing the stapler mechanism.
Figure 31:
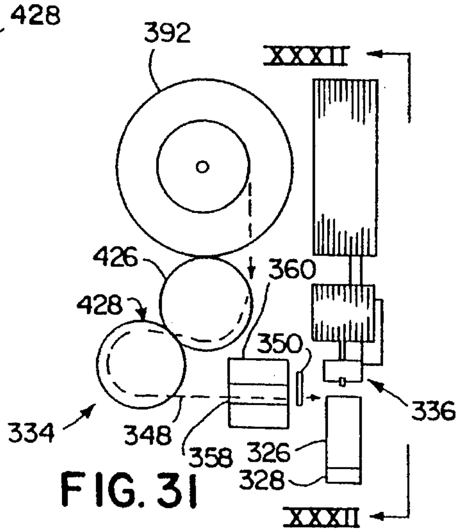
FIG. 31 is a schematic showing the tag advancing mechanism, embossing dies, tag cutter, and stapler mechanisn.
Figure 32:
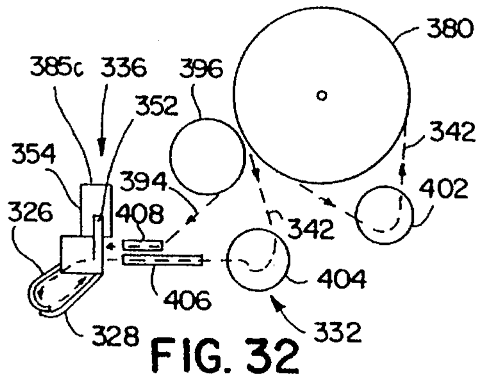
FIG. 32 is a schematic view showing the staple wire feed mechanism and the strip advancing mechanism.
Figure 30:
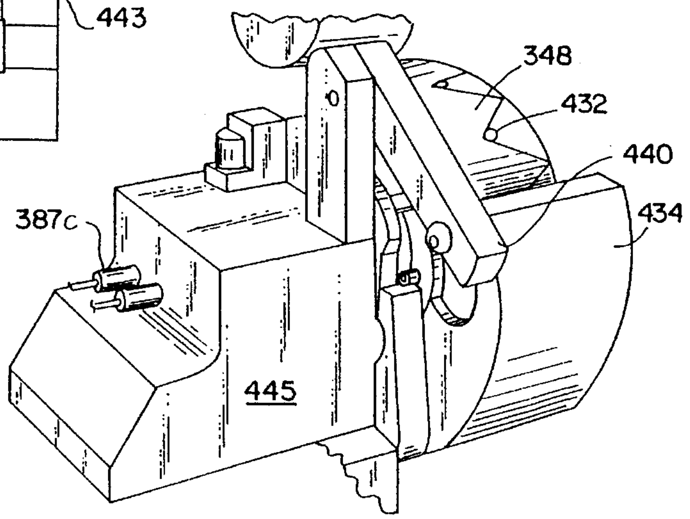
FIG. 30 is a perspective view of the ratcheting mechanism on the indexing mechanism of the tag advancing mechanism.

Apparatus 320 (FIG. 16) includes a frame or structure 322 mounted on a stand 324, and further includes jaws 326 and 328 operably mounted on the frame 322 for receiving plant branch or stem 330. The apparatus 320 includes a strip advancing mechanism 332 (FIGS. 20 and 32), a tag advancing mechanism 334 (FIGS. 22 and 31), a fastening or stapler mechanism 336 (FIGS. 20, 26 and 32), and a sequencer including a programmable microprocessor/controller 338 (FIGS. 21 and 33) for controlling actuation of the mechanisms 328, 332, 334, and 336. The strip advancing mechanism 332 is configured to advance a section of flexible strip 340 from a continuous supply of strip material 342 and includes a cutter 343 for cutting the section 340 from the continuous supply 342. The tag advancing mechanism 334 is configured to advance the tag 346 from a continuous supply of interconnected tags 348, and includes a cutter 350 for cutting the tag 346 from the supply of tags 348. The fastening mechanism 336 includes a staple cutter 352 for forming a staple 356 and a stapler 354 for stapling the staple 356 to hold tag 346 to the section of strip 340 and for securing the ends 340*a* and 340*b* (FIG. 17) of section 340 together in a loop around the branch 330. An embossing die 358 (FIG. 16) is located in die clamps 360 and 362 adjacent the jaws 326 and 328 for embossing tags 346 with indicia 364 (FIG. 17) immediately prior to the stapler 354. Embossed indicia 364 facilitates inventory control, such as by including a sequential number printed on each successive tag, and provides a customized attractive tag that does not detract from the printed indicia/information 366 on the tag.

FIG. 17 illustrates a thin metal, generally rectangularly-shaped tag 346 secured to a branch 330 by flexible strip section 340. A bottom of tag 346 is tapered at corners 346*a* for appearance and also to reduce the sharpness of the corners. Staple 356 engages the ends 340*a* and 340*b* and an end of tag 346 to secure the tag assembly together. Tag 346 is made of an embossable material such as a foil or laminate. The material is further of the type which can be readily printed upon to form a long-lasting and attractive tag. Flexible strip section 340 is made of a UV-stable, flexible material such as a propylene or other durable polymer material which is resiliently flexible but which is also structurally stiff enough to be extended along curvilinear surfaces on the jaws of apparatus 320 to form a loop as hereinafter described.

Stand 324 (FIG. 16) is shaped much like a table, and includes legs 370 and a platform 372. Jaws 326 and 328 are positioned to overhang the front edge 372*a* of platform 372 for easy access. Mechanisms 332, 334, and 336 are operably mounted to platform 372, and are generally protected by a sheet metal safety guard 373 or the like.

A mounting block 374 (FIG. 20) is secured adjacent platform front edge 372*a*, and upright supports 376 and 378 are attached to platform 372. Lower jaw 328 is slideably connected to mounting block 374 by a shaft 349. A holder 380 is rotatably mounted by a stud (not shown) to rear support 378. Holder 380 is configured to receive the wound roll (i.e. supply) of flexible strip material 342. A cross piece 382 extends between supports 376 and 378, and actuator control valves 384–390 are attached thereto. Also, a second holder 392 is attached to front support 376. Second holder 392 is configured to receive the wound roll (i.e. supply) of wire 394 for forming staples (356). A third holder 396 is attached to front support 376 for receiving the wound roll (i.e. supply) of tags 348.

Figure 23:
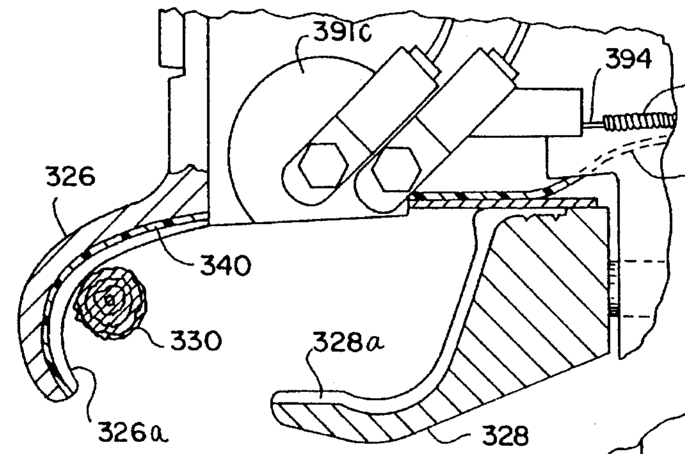
FIG. 23 is an enlarged, cross-sectional view taken along the plane XXIII—XXIII in FIG. 22, the jaws being shown in the open position.
Figure 24:
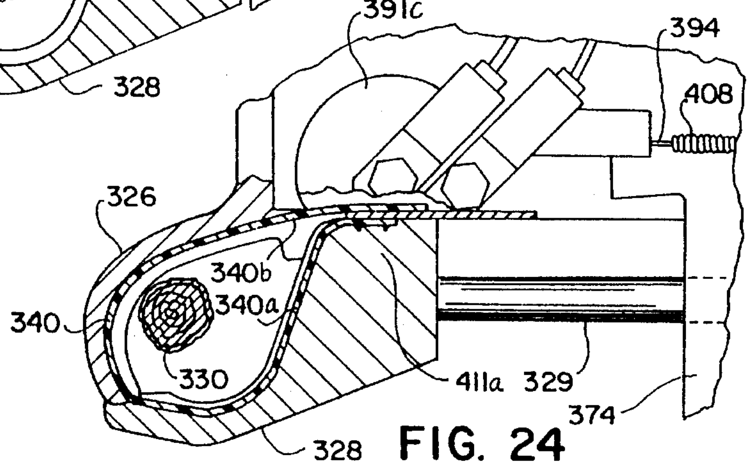
FIG. 24 is a cross-sectional view identical to FIG. 23 but with the jaws being shown in the closed position.
Figure 27:
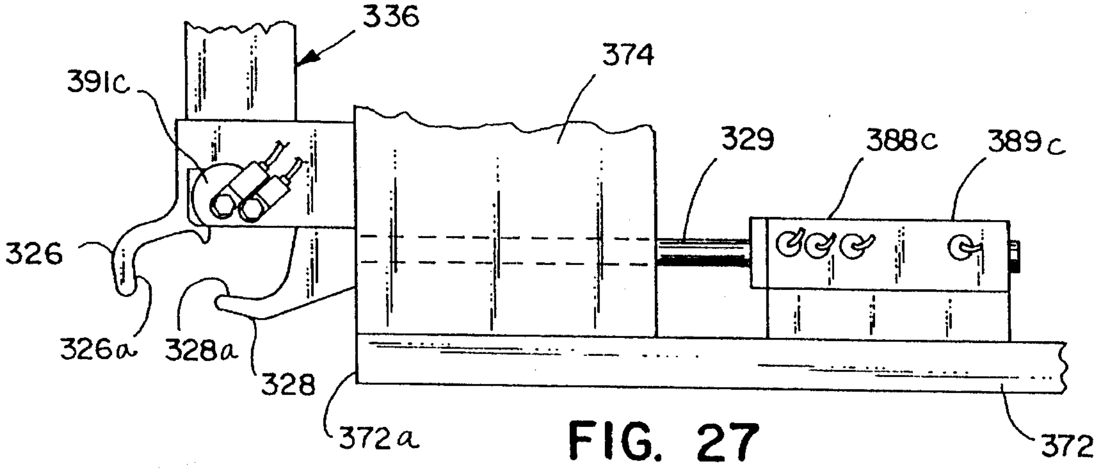
FIGS. 27 and 28 are side-elevational views showing the jaws in open and closed positions, respectively, including an actuator for same.
Figure 28:
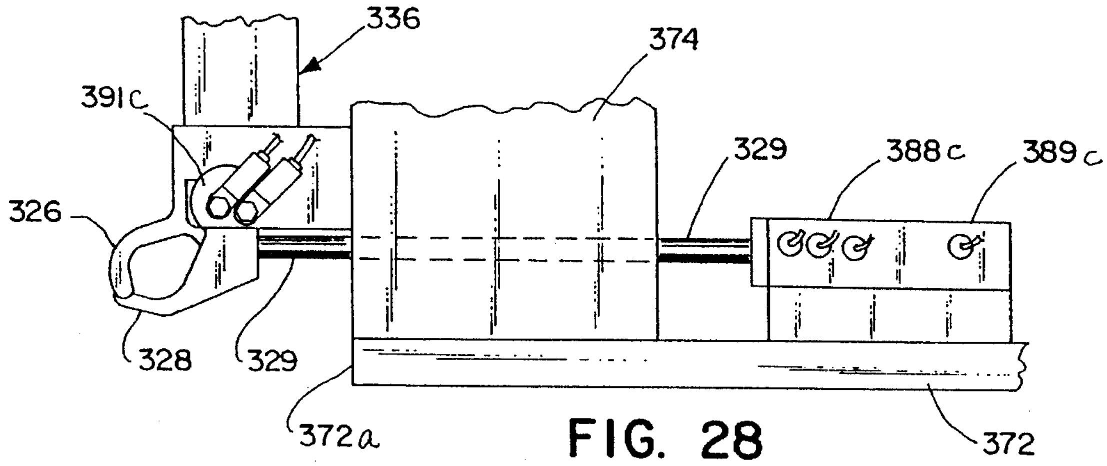

Flexible strip 342 (FIG. 32) extends from supply 342 around tensioner 402 and back around supply 342 (one time) to flexible strip indexer 404. Strip supply 342 is fed by indexer 404 along a guide 406 into jaws 326 and 328. As a particular section 340 is fed onto the inner surface 326*a* of upper jaw 326 and then onto inner surface 328*a* of lower jaw 328 (FIGS. 23–24), the section 340 is guided around branch 330 and back onto itself. (See also FIGS. 27–28.) Notably, by changing jaws 326 and 328, different sizes of loops can be formed by strip section 340 around branch 330. A pneumatically operated actuator 384*c* (FIGS. 20–21, and 33) is operably connected to strip indexer 404.

Staple wire 394 (FIG. 32) is fed from holder 392 through wire feeder 408 to staple cutter 352 and stapler 354 by a pneumatically operated wire feeder actuator 385*c*. Wire feeder 408 guides wire 394 past wire cutter 352 (FIG. 26) and under a pair of upper telescoping staple forming dies 409 and 410, and over a lower staple forming die or mandrel 411. After cutter 352 cuts wire section 356*a* from wire 398, outer upper die 410 extends downwardly over lower mandrel 411 to form a U-shaped staple 356. Mandrel 411 is then retracted, and inner upper die 409 drives staple 356 through strip ends 340*a* and 340*b* and tag 346. The legs of staple 356 are then folded under by a grooved anvil 411*a* formed on lower jaw 328. Actuators 390*c* and 391*c* (FIGS. 20 and 33) are operably connected to members 352, 409, 410 and 411 for operating stone.

Figure 33:
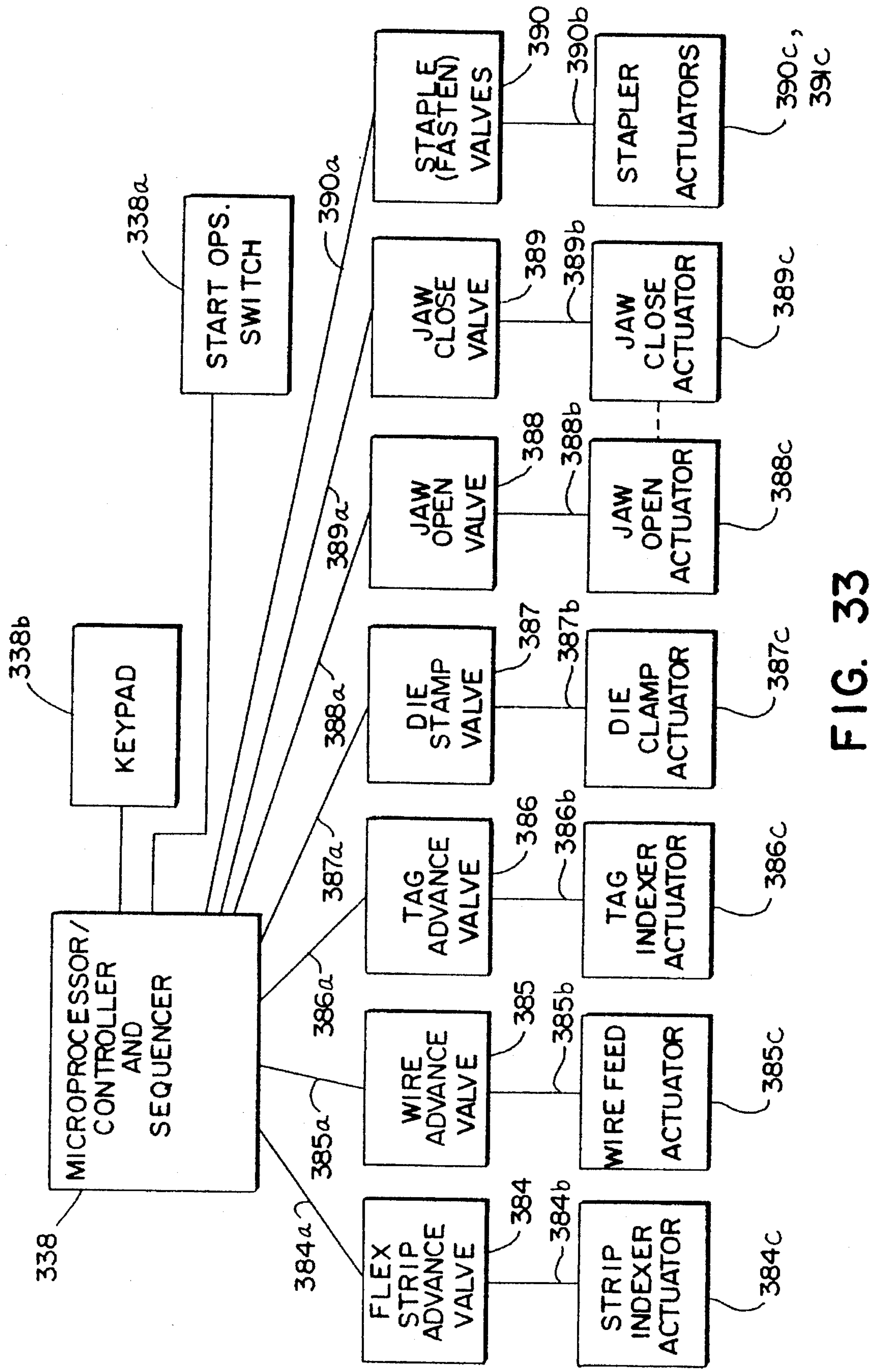
FIG. 33 is a schematic showing the controller/sequencer for controlling the actuators of the various mechanisms shown in FIGS. 19–33.

The sequencer/programmable microprocessor 338 (FIG. 21) can be located substantially anywhere on apparatus 320, but is illustrated as being affixed to cross piece 382. It is noted that controller 338 can be replaced by pneumatic logic devices or other sequencing devices, and that actuators on mechanisms 332, 334 and 336 can be replaced by non-pneumatic devices. However, the preferred device includes a connector 412 for connecting to a source of pressurized air 414. An air gauge 416 and air pressure regulator 418 are attached to air line 420 leading from connector 412 to the bank of control valves 384–390. Exhaust vents 420 are located on valves 384–390 for exhausting compressed air to atmosphere. Controller 338 is connected to a source of electrical power by power cord 422, and is electrically connected by electrical cables 384*a*–390*a* (FIG. 33) to solenoids on control valves 384–390 for controlling same. Valves 384–309 are pneumatically connected by air lines 384*b*–390*b* (FIGS. 20 and 33) to operate mechanism actuators 384*c*–390*c* (FIG. 33). Controller 338 includes an on/off switch 338*a* and a keypad 338*b* for programming controller 338. Also, a foot actuated switch 339 (FIG. 16) is connected to controller 338 by a wire 339*a* for initiating a cycle.

Figure 25:
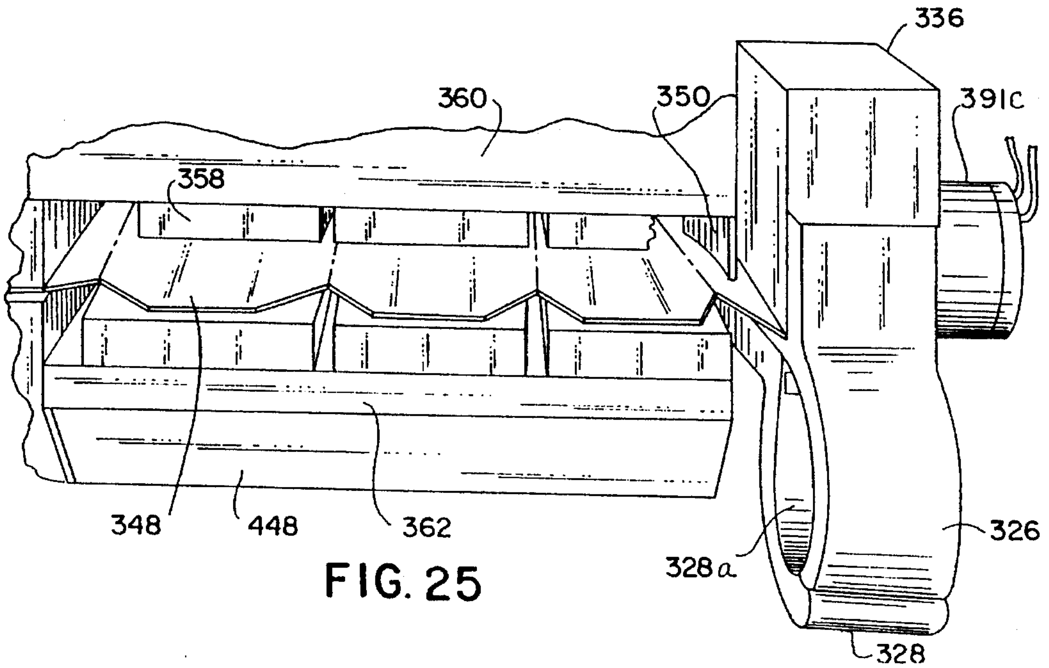
FIG. 25 is an enlarged front perspective view of the embossing die and tag cutter.
Figure 29:
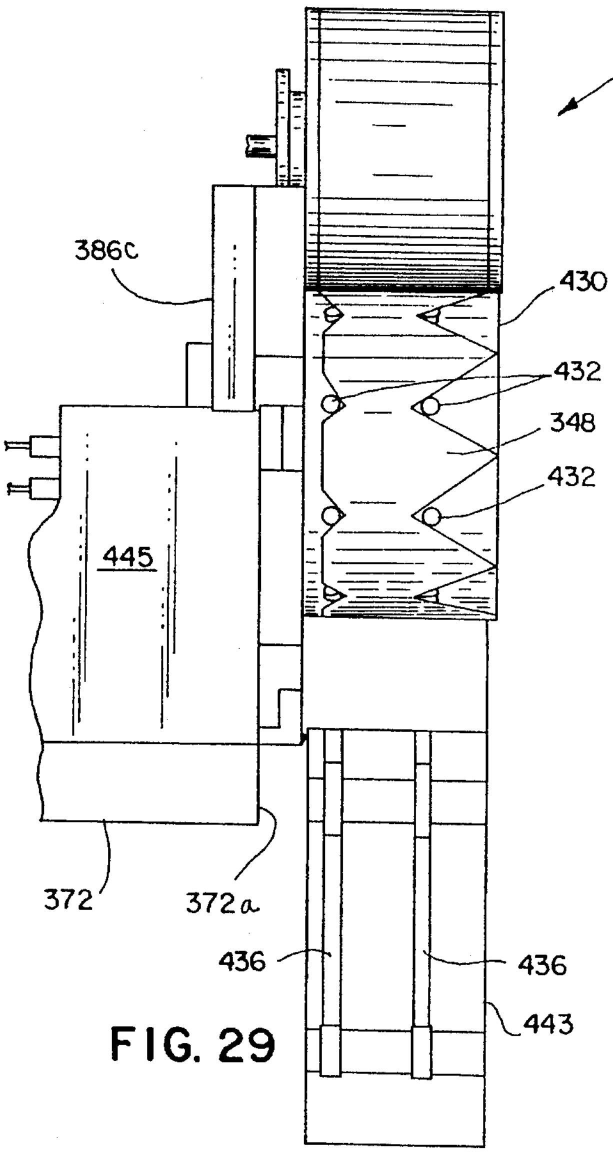
FIG. 29 is a left-hand, enlarged, fragmentary side-elevational view of the indexing wheel and associated components on the tag advancing mechanism, the outer guide arm being in the open, loading position for threading a strip of tags into the tag advancing mechanism.

The continuous strip of tags 348 (FIGS. 22 and 31) are fed from tag supply holder 392 around a tensioning wheel 426 to tag indexer 428. Tag indexer 428 includes an inner rotatable wheel 430 (FIG. 29) having multiple protruding pairs of pins 432 for registering on notches in tag supply 348. Notably, the notches become corners 346*a* in individual tags 346 (FIG. 17) once the tags 346 are sheared apart. A guide 434 (FIGS. 22 and 29) clamps against wheel 430 to hold tag supply 348 to wheel 430. Guide 434 (FIG. 29) is arcuately shaped, and includes a pair of channels 436 for slideably receiving pin pairs 432. A ratcheting mechanism 438 (FIG. 22) includes a ratcheting arm 440 that steps wheel 430 incrementally rotatably around its axis. As tags 348 are extended from wheel 430, tags 348 travel between clamps 360 and 362 and under embossing die 358 (FIG. 25). It is noted that multiple embossing dies can be used, such as a first embossing die for embossing the nursery's indicia or trademark on the tag, and a second embossing die that embosses a sequential inventory control number on the tag. Tags 348 travel from embossing die 358 under tag cutter 350 into a position between strip section ends 340*a* and 340*b* on jaw 328 under stapler 354.

Upper die clamp 360 (FIG. 21) is actuated by an actuator

387*c*. Actuator 387*c* is connected to a wedge-shaped member 444 that forces upper clamp downwardly as wedge-shaped member 444 is forced forwardly. More specifically, a C-shaped die holding frame 445 (FIG. 21) includes an upper leg 446 (FIG. 22) and a lower leg 448. Embossing die 358 is position below upper leg 446, and a resilient bed 450 is positioned on lower leg 448. By extending wedge 444 between embossing die 358 and upper leg 446, die 358 is forced onto bed 450 thus embossing a tag 346 located therebetween.

It is noted that many of the above noted components can be purchased as separate components, such as the items shown in FIG. 33, or could be adapted from purchasable products by a person skilled in making this type of machinery. Still further, it is contemplated that many of the illustrated components can be replaced by substitute components. For example, it is contemplated that stapler mechanism 336 could be replaced by another stapler mechanism utilizing preformed staples, and tag advancing mechanism 334 could be replaced by another mechanism for advancing individual separate tags.

OPERATION

The operation of apparatus 320 is as follows. Lower jaw 328 is initially retracted by jaw open actuator 388*c*, and controller 338 is programmed as desired. Also, the apparatus 320 is otherwise readied for use, such as by threading flexible strip supply 342 around strip advancing mechanism 332, threading staple wire supply 394 around stapler mechanism 336, and threading tag supply 348 around tag advancing mechanism 334.

A plant branch 330 is positioned in surface 326*a* of upper jaw 326. Foot switch 339 is then actuated, which causes controller 338 to actuate strip indexer actuator 384*c* to advance strip 342, actuate wire feed actuator 385*c* to advance wire 394, and actuate tag indexer actuator 386*c* to advance tags 348. Thus, a section of flexible strip 340 extends around jaw surfaces 326*a* and 340*b* and around branch 330 to a position adjacent a tag 346. Stapler actuators 390*c* and 391*c* are actuated so that a staple 356 is cut from wire 394, is formed into an inverted U shape, and is stapled into items 340*a*, 346 and 340*b* to secure same together. Die clamp actuator 387*c* is also actuated to close embossing die 358 onto a "later" tag 346 and to operate tag cutter 350 to sever the tag 346 located in jaws 326/328 from tag supply 348. Jaw open actuator 388*c* is then actuated to release plant branch 330, which branch now is tagged by looped section 340 and tag 346.

In the foregoing description it will be readily appreciated by a person skilled in the art that modifications may be made to the invention without departing from the concepts disclosed herein. Such modifications are to be considered as included in the following claims unless these claims by their language expressly state otherwise. The scope of the invention is intended to be limited only by the scope of the appended claims as interpreted according to the principles of patent law including the Doctrine of Equivalents.

The embodiments of the invention in which an exclusive property or privilege is claimed are defined as follows:

1. An apparatus for tagging plants, comprising:

jaws for receiving a branch including surfaces for advancing a section of flexible strip in a loop around the branch when the branch is positioned in the jaws;

a strip-advancing mechanism for advancing the section of flexible strip onto said surfaces on said jaws;

a tag-advancing mechanism for advancing a tag into a position proximate said jaws;

a fastening mechanism for fastening the tag to the section of strip and for fastening the strip in a permanent loop around the branch; and a sequencer for actuating said jaws, said strip-advancing mechanism, said tag-advancing mechanism and said fastening mechanism in a predetermined sequence.

2. The apparatus as defined in claim 1 including an embossing die for embossing the tag, said tag-advancing mechanism being adapted to advance the tag through said embossing die.

3. The apparatus as defined in claim 2 wherein said tag-advancing mechanism is configured to feed a continuous connected strip of tags, and including a tag cutter for cutting the tag from the continuous connected strip of tags.

4. The apparatus as defined in claim 3 including a strip cutter for cutting the section of strip from a continuous supply of flexible strip material.

5. The apparatus as defined in claim 1 wherein said sequencer includes a programmable microprocessor.

6. The apparatus as defined in claim 1 wherein each of said strip-advancing mechanism, said jaws, said tag-advancing mechanism and said fastening mechanism include pneumatic actuator operably connected to said sequencer.

7. The apparatus as defined in claim 1 wherein said fastening mechanism includes a stapler.

8. The apparatus as defined in claim 7 including a wire-advancing mechanism for advancing a continuous staple-forming wire to said stapler, said stapler including a wire cutter for cutting a section from the wire and a staple-forming die for forming a staple from the section of wire.

9. The apparatus as defined in claim 1 including means for supplying a continuous series of tags to said tag-advancing mechanism, means for supplying a continuous supply of sections of flexible strip to said strip-advancing mechanism, and means for supplying a continuous supply of staples to said fastening mechanism.

10. An apparatus for tagging plants, comprising:

a frame;

jaws operably mounted on said frame for receiving a branch;

an embossing die operably mounted on said frame for embossing a tag;

a tag-advancing mechanism operably mounted on said frame for advancing a tag through said embossing die into a position proximate said jaws; and a fastening mechanism for fastening the tag to a section of flexible strip positioned around the branch for holding the tag permanently to the branch.

11. The apparatus as defined in claim 10 including a stand supporting said frame.

12. The apparatus as defined in claim 10 wherein said jaws include curvilinear surfaces for advancing the section of flexible strip in a loop around the branch when the branch is positioned in said jaws, and further including a strip-advancing mechanism for advancing the section of flexible strip onto said curvilinear surfaces.

13. The apparatus as defined in claim 10 including a cutter associated with said embossing die for cutting the tag from a continuous connected supply of tags.

* * * * *

UNITED STATES PATENT AND TRADEMARK OFFICE

CERTIFICATE OF CORRECTION

PATENT NO. : 5,467,524

DATED : November 21, 1995

INVENTOR(S) : Gordon J. Diemer

It is certified that error appears in the above-indentified patent and that said Letters Patent is hereby corrected as shown below:

Column 1, line 7;

"Dieruer" should be --Diemer--.

Column 2, line 35;

"it a" should be --is a--.

Column 3, line 48;

"mechanisn" should be --mechanism--.

Column 6, line 3;

After "lower" delete ":".

Column 6, line 33;

"Stirface 191" should be --Surface 191--.

Column 8, line 46;

"to tire" should be --to the--.

Column 8, line 57;

"to tire" should be --to the--.

UNITED STATES PATENT AND TRADEMARK OFFICE

CERTIFICATE OF CORRECTION

PATENT NO. : 5, 467,524

DATED : November 21, 1995

INVENTOR(S) : Gordon J. Diemer

It is certified that error appears in the above-indentified patent and that said Letters Patent is hereby corrected as shown below:

Column 8, line 60;

"of tire" should be --of the--.

Column 10, line 21;

"stone" should be --same--.

Signed and Sealed this

Thirteenth Day of August, 1996

Attest:

BRUCE LEHMAN

*Attesting Officer*

*Commissioner of Patents and Trademarks*